(12) United States Patent
Nazarathy et al.

(10) Patent No.: US 10,116,404 B2
(45) Date of Patent: Oct. 30, 2018

(54) SYSTEM AND METHOD FOR OFDM SYMBOL INTERLEAVING

(71) Applicant: Technion research & Development Ltd.

(72) Inventors: Moshe Nazarathy, Haifa (IL); Amitay Bar, Haifa (IL); Aviv Shalom, Haifa (IL); Igor Tselniker, Haifa (IL)

(73) Assignee: Technion Research and Development Foundation LTD., Haifa (IL)

( * ) Notice: Subject to any disclaimer, the term of this patent is extended or adjusted under 35 U.S.C. 154(b) by 0 days.

(21) Appl. No.: 15/796,857

(22) Filed: Oct. 30, 2017

(65) Prior Publication Data

US 2018/0076916 A1   Mar. 15, 2018

Related U.S. Application Data

(63) Continuation of application No. 14/790,274, filed on Jul. 2, 2015, now Pat. No. 9,806,837.

(60) Provisional application No. 62/020,467, filed on Jul. 3, 2014.

(51) Int. Cl.
| | |
|---|---|
| *H04J 4/00* | (2006.01) |
| *H04L 27/26* | (2006.01) |
| *H04J 11/00* | (2006.01) |
| *H04L 1/00* | (2006.01) |
| *H04L 5/00* | (2006.01) |

(52) U.S. Cl.
CPC ........ *H04J 11/0023* (2013.01); *H04L 1/0071* (2013.01); *H04L 27/264* (2013.01); *H04L 27/2636* (2013.01); *H04L 5/003* (2013.01)

(58) Field of Classification Search
CPC ............... H04J 11/0023; H04L 1/0071; H04L 27/2636; H04L 27/264
See application file for complete search history.

(56) References Cited

U.S. PATENT DOCUMENTS

| | | | | |
|---|---|---|---|---|
| 2005/0058089 A1* | 3/2005 | Vijayan | ................... | H04B 7/12 370/312 |
| 2008/0240231 A1* | 10/2008 | Yang | .................... | H04L 1/0045 375/240.01 |
| 2013/0121131 A1* | 5/2013 | Dapper | .................. | G06F 17/14 370/210 |
| 2014/0044094 A1* | 2/2014 | Vijayan | ................... | H04B 7/12 370/330 |

* cited by examiner

Primary Examiner — Tesfaldet Bocure
(74) Attorney, Agent, or Firm — Reches Patents

(57) ABSTRACT

An orthogonal frequency division multiplexing (OFDM) transmitter that includes an encoder, an interleaver, a symbol processor; and a transmission module; wherein the encoder is configured to encode a superframe to provide an encoded superframe; wherein the encoded superframe comprises a sequence of encoded frames; wherein the interleaver is configured to allocate multiple frequency sub-bands to each encoded frame of the encoded superframe by assigning adjacent frequency sub-bands to successive symbols of each encoded frame; wherein the symbol processor is configured to generate, for each encoded frame and according to the assignment of the multiple frequency sub-bands, an intermediate set of symbols; and wherein the transmission module is configured to transmit simultaneously, for each encoded frame, OFDM symbols that represents the intermediate set of symbols.

3 Claims, 12 Drawing Sheets

SYSTEM AND METHOD FOR OFDM SYMBOL INTERLEAVING

This application claims priority from U.S. patent application Ser. No. 14/790,274 filing date Jul. 2, 2015—now issued as U.S. Pat. No. 9,806,837 issued on Oct. 31 2017—which claims priority from provisional patent Ser. No. 62/020,467 filing date Jul. 3 2015, all being incorporated herein by reference.

BACKGROUND

There is a growing need to increase the throughput of communication links while maintaining high quality of the transmitted symbols. OFDM systems multiplex symbols in the frequency domain thereby increasing the throughput. During the generation of the OFDM symbols phase noise is added to the OFDM symbols. There is a need to reduce the phase noise.

The following articles provide an illustration of the prior art:

[1] K.-P. Ho, "Subband equaliser for chromatic dispersion of optical fibre," *Electron. Lett.*, vol. 45, no. 24, p. 1224, 2009.

[2] M. Nazarathy and A. Tolmachev, "Sub-banded DSP architectures based on under-decimated filter-banks for coherent OFDM receivers," *IEEE Signal Process. Mag.*, Special Issue on Advanced DSP and Coding for Multi-Tb/s Optical Transport 31, pp. 70-81 (2014).

[3] A. Tolmachev, M. Orbach, M. Meltsin, R. Hilgendorf, Y. Birk, and M. Nazarathy, "Real-time FPGA Implementation of Efficient Filter-Banks for Digitally Sub-banded Coherent DFT-S OFDM Receiver," in *OFC'13*, 2013, p. OW3B.1.

[4] M. Nazarathy and A. Tolmachev, "Digitally sub-banded coherent optical OFDM transmission," in *OFC 2014*, 2014, pp. Invited, Tu3G.1.

[5] W. Shieh, Y. Tang, and B. S. Krongold, "DFT-Spread OFDM for Optical Communications," in *9th International Conference on Optical Internet (COIN)*, 2010, 2010.

[6] C. Li, Q. Yang, T. Jiang, Z. He, M. Luo, C. Li, X. Xiao, D. Xue, and X. Yi, "Investigation of Coherent Optical Multi-band DFT-S OFDM in Long Haul Transmission," *Photonics Technol. Lett.*, 2012.

[7] Y. Tang, W. Shieh, and B. S. Krongold, "DFT-Spread OFDM for Fiber Nonlinearity Mitigation," *IEEE Photon. Technol. Lett.*, vol. 22, no. 16, pp. 1250-1252, August 2010.

[8] G. Shulkind and M. Nazarathy, "An analytical study of the improved nonlinear tolerance of DFT-spread OFDM and its unitary-spread OFDM generalization," *Opt. Express*, vol. 20, no. 23, pp. 25884-25901, 2012.

[9] Y. Tang, W. Shieh, and B. S. Krongold, "Fiber Nonlinearity Mitigation in 428-Gb/s Multiband Coherent Optical OFDM Systems," in *OFC/NFOEC—Conference on Optical Fiber Communication and the National Fiber Optic Engineers Conference*, 2010, p. JThA6.

[10] X. Liu, P. Winzer, C. Sethumadhavan, S. Randel, and S. Corteselli, "Multiband DFT-Spread-OFDM Equalizer with Overlap-and-Add Dispersion Compensation for Low-Overhead and Low-Complexity Channel Equalization," in *OFC'13*, 2013, vol. 2, no. 2, p. OW3B.2.

[11] N. Sigron, I. Tselniker, and M. Nazarathy, "Carrier phase estimation for optically coherent QPSK based on Wiener-optimal and adaptive Multi-Symbol Delay Detection (MSDD)," *Opt. Express*, vol. 20, no. 3, pp. 1981-2003, January 2012.

[12] I. Tselniker, N. Sigron, and M. Nazarathy, "Joint phase noise and frequency offset estimation and mitigation for optically coherent QAM based on adaptive multi-symbol delay detection (MSDD)," *Opt. Express*, vol. 20, no. 10, pp. 10944-10962, 2012.

[13] A. Tolmachev, I. Tselniker, M. Meltsin, I. Sigron, D. Dahan, A. Shalom, and M. Nazarathy, "Multiplier-free Phase Recovery with Polar-domain Multi-Symbol-Delay-Detector," *J. Light. Technol.*, 2013.

[14] I. Tselniker, A. Tolmachev, M. Nazarathy, and S. Member, "Multiplier-Free Joint Carrier Recovery for 16-QAM Synchronous or Agile Burst Receivers," *Photonics Technol. Lett.*, vol. 25, no. 21, pp. 2133-2136, 2013.

[15] S. Zhang, P. Y. Kam, J. Chen, and C. Yu, "Decision-aided maximum likelihood detection in coherent optical phase-shift-keying system," *Opt. Express*, vol. 17, no. 2, pp. 703-715, 2009.

[16] X. Zhou, "Hardware Efficient Carrier Recovery Algorithms for Single-Carrier QAM systems," in *Advanced Photonics Congress, SPPCOM'12*, 2012, p. SpTu3A.1.

[17] T. Pfau, S. Hoffmann, and R. Noe, "Hardware-Efficient Coherent Digital Receiver Concept With Feedforward Carrier Recovery for-QAM Constellations," *J. Light. Technol.*, vol. 27, no. 8, pp. 989-999, 2009.

[18] I. Fatadin, D. Ives, and S. J. Savory, "Laser Linewidth Tolerance for 16-QAM Coherent Optical Systems Using QPSK Partitioning," *Photonics Technol. Lett.*, vol. 22, no. 9, pp. 631-633, 2010.

[19] Q. Zhuge, X. Xu, Z. A. El-Sahn, M. E. Mousa-Pasandi, M. Morsy-Osman, M. Chagnon, M. Qiu, and D. V. Plant, "Experimental investigation of the equalization-enhanced phase noise in long haul 56 Gbaud DP-QPSK systems," Opt. Exp. 20, 13841-13846 (2012)

[20] A. P. T. Lau, T. S. R. Shen, W. Shieh and K. P. Ho, "Equalization-enhanced phase noise for 100 Gb/s transmission and beyond with coherent detection," Optics Express, vol. 18, pp. 17239-17251, (2010).

[21] M. G. Taylor, "Phase Estimation Methods for Optical Coherent Detection Using Digital Signal Processing," *J. Light. Technol.*, vol. 27, no. 7, pp. 901-914, 2009.

[22] N. Kikuchi, "Higher-order Multilevel Signal Transmission using Coherent Receiver with Digital-Delay Detection," in *OFC 2013*, 2013, p. OTh4E.5.

[23] X. Liu, "Data-Aided Multi-Symbol Phase Estimation for Receiver Sensitivity Enhancement in Optical DQPSK—paper CThB4," in *Coherent Optical Techniques and Applications (COTA)*, 2006.

[24] K. P. Zhong, J. H. Ke, Y. Gao, and J. C. Cartledge, "Linewidth-Tolerant and Low-Complexity Two-Stage Carrier Phase Estimation Based on Modified QPSK Partitioning for Dual-Polarization 16-QAM Systems," *J. Light. Technol.*, vol. 31, no. 1, pp. 50-57, 2013.

[25] W. Shieh and K. Ho, "Equalization-enhanced phase noise for coherent-detection systems using electronic digital signal processing," *Opt. Express*, vol. 16, no. 20, pp. 15718-15727, 2008.

[26] A. P. T. Lau, W. Shieh, and K.-P. Ho, "Equalization-Enhanced Phase Noise for 100 Gb/s transmission with coherent detection," in *OptoElectronics and Communications Conference, 2009. OECC*, 2009, vol. 3, p. FQ3.

[27] P. Vaidaynathan, S.-M. Phoong, and Y.-P. Lin, *Signal Processing and optimization for transceiver systems*. Cambridge Univ. Press, 2010.

[28] T. M. Schmidl and D. C. Cox, "Robust frequency and timing synchronization for OFDM," *Commun. IEEE Trans.*, vol. 45, no. 12, pp. 1613-1621, 1997.

[29] H. Minn, V. K. Bhargava, and K. B. Letaief, "A robust timing and frequency synchronization for OFDM systems," *Wirel. Commun.*, vol. 24, pp. 822-839, 2003.

[30] A. Bar, A. Tolmachev, M. Nazarathy, and S. Member, "In-Service Monitoring of Chromatic Dispersion With Filter-Bank Digitally Sub-Banded OFDM," *Photonics Technol. Lett.*, vol. 25, no. 22, pp. 2189-2192, 2013.

[31] B. Porat, *A Course in Digital Signal Processing*. John Wiley and Sons, 1997.

SUMMARY

There are provided an OFDM receiver, an OFDM transmitter and a method for interleaving and de-interleaving OFDM symbols according to various embodiments of the invention.

An orthogonal frequency division multiplexing (OFDM) transmitter, may include an encoder, an interleaver, a symbol processor; and a transmission module; wherein the encoder may be configured to encode a superframe to provide an encoded superframe; wherein the encoded superframe may include a sequence of encoded frames; wherein the interleaver may be configured to allocate multiple frequency sub-bands to each encoded frame of the encoded superframe by assigning adjacent frequency sub-bands to successive symbols of each encoded frame; wherein the symbol processor may be configured to generate, for each encoded frame and according to the assignment of the multiple frequency sub-bands, an intermediate set of symbols; and wherein the transmission module may be configured to transmit simultaneously, for each encoded frame, OFDM symbols that represents the intermediate set of symbols.

The OFDM transmitter wherein each intermediate set of symbols is a weighted sum of the symbols of the encoded frame.

The encoder may be configured to differentially encode the superframe.

The encoder may be configured to encode the superframe by an encoding scheme that differs from differential encoding.

The encoder may be configured to encode each symbol of the superframe by replacing a phase of the symbol by a phase difference between the symbol and a preceding symbol of the superframe.

The symbol processor may include a set of time domain to frequency domain converters, a frequency domain to time domain converter and a parallel to serial converter; wherein each time domain to frequency converter is associated with a unique sub-band of the multiple sub-bands; wherein outputs of the set of time domain to frequency domain converters are coupled to inputs of the frequency domain to time domain converter; wherein outputs of the frequency domain to time domain converter are coupled to a parallel to serial converter.

The parallel to serial converter may be configured to output, intermediate sets of symbols that are ordered according to an order of corresponding encoded frames within the encoded superframe.

The set of time domain to frequency domain converters may include a set of Fourier transform converters, and wherein the frequency domain to time domain converter is an Inverse Fourier transform converter.

The parallel to serial converter is preceded by a cyclic prefix module; wherein the parallel to serial converter is followed by a digital to analog converter.

The transmission module may include a laser and a laser modulator that may be configured to modulate the laser by each set of intermediate symbols to provide the OFDM symbol that represents the intermediate set of symbols.

The encoded superframe may include (M−1) encoded frames of N bits each, wherein N and M are positive integers that exceed one; wherein the interleaver may include a first one to (M−1) serial to parallel converter that is followed by (M−1) one to N serial to parallel converters.

According to an embodiment of the invention there may be provided a method for generating and transmitting orthogonal frequency division multiplexing (OFDM) symbols, the method may include encoding, by an encoder, a superframe that may include a sequence of frames to provide an encoded superframe; allocating, by an interleaver, multiple frequency sub-bands to each encoded frame of the encoded superframe by assigning adjacent frequency sub-bands to successive symbols of each encoded frame; generating, by a symbol processor, for each encoded frame and according to the allocation of the multiple frequency sub-bands, an intermediate set of symbols; and transmitting, by a transmission module, simultaneously, for each encoded frame, OFDM symbols that represent the intermediate set of symbols.

Each encoded frame symbol may be a weighted sum of all the symbols of the encoded frame.

The method may include differentially encoding the superframe.

The method may include encoding the superframe by an encoding scheme that differs from differential encoding.

The method may include encoding each symbol of the superframe by replacing a phase of the symbol by a phase difference between the symbol and a preceding symbol of the superframe.

The symbol processor may include a set of time domain to frequency domain converters, a frequency domain to time domain converter and a parallel to serial converter; wherein each time domain to frequency converter is associated with a unique sub band; wherein outputs of the set of time domain to frequency domain converters are coupled to inputs of the frequency domain to time domain converter; wherein outputs of the frequency domain to time domain converter are coupled to a parallel to serial converter.

The method may include outputting, by the parallel to serial converter, intermediate sets of symbols that are ordered according to an order of corresponding encoded frames within the encoded superframe.

The method may include performing a cyclic prefix operation before performing, by the parallel to serial converter, a parallel to serial conversion.

The method may include modulating a laser by each set of intermediate symbols to provide the OFDM symbol that represents the intermediate set of symbols.

The encoded superframe may include (M−1) encoded frames of N bits each, wherein N and M are positive integers that exceed one; wherein the interleaver may include a first one to (M−1) serial to parallel converter that is followed by (M−1) one to N serial to parallel converters.

According to an embodiment of the invention there may be provided an orthogonal frequency division multiplexing (OFDM) receiver that may include a decoder, a de-interleaver, a symbol processor; and a reception module; wherein the reception module may be configured to receive OFDM symbols representative of an encoded superframe that may include multiple encoded frames; wherein the symbol processor may be configured to generate, in response to OFDM symbols associated with each encoded frame, all received symbols that are associated with the encoded frame; wherein adjacent symbols of each encoded frame are represented by OFDM symbols that belong to adjacent sub-bands; wherein the de-interleaver may be configured to de-interleave all received symbols that are associated with each encoded frame to provide the encoded superframe; and wherein the decoder may be configured to decode the encoded superframe to provide a decoded superframe.

According to an embodiment of the invention there may be provided method for receiving orthogonal frequency division multiplexing (OFDM) signals, the method may include receiving OFDM symbols representative of an encoded superframe that may include multiple encoded frames; generating, in response to OFDM symbols associated with each encoded frame, all received symbols that are associated with the encoded frame; wherein adjacent symbols of each encoded frame are represented by OFDM symbols that belong to adjacent sub-bands; de-interleaving all received symbols that are associated with each encoded frame to provide the encoded superframe; and decoding the encoded superframe to provide a decoded superframe.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
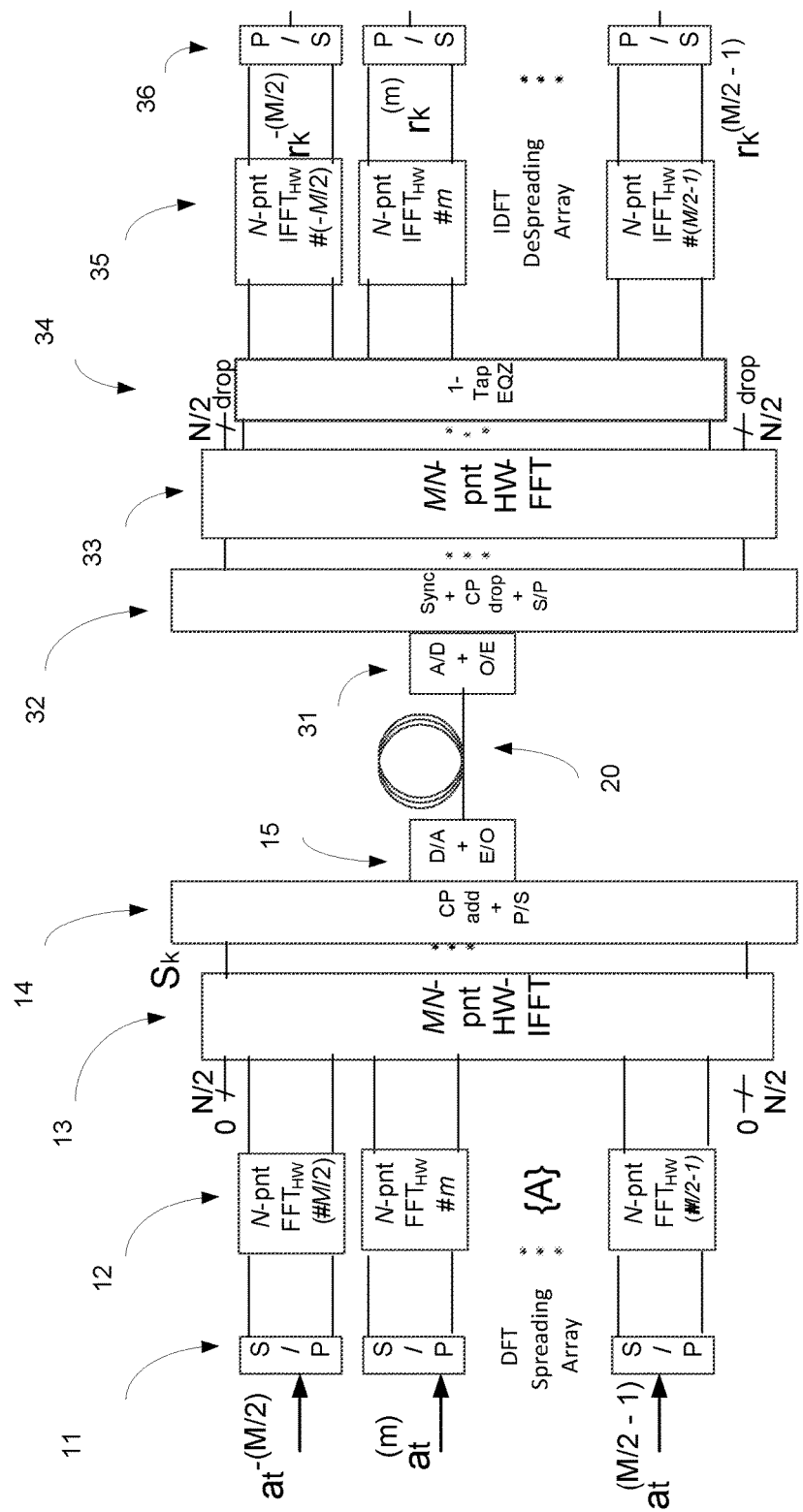
FIG. 1 illustrates a DFT-spread OFDM system.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method.

Any reference in the specification to a system should be applied mutatis mutandis to a method that may be executed by the system.

Recently, there has been interest in applying various sub-band (de)multiplexing methods to digital coherent transmission. The idea is to digitally slice the channel spectrum into contiguous sub-bands, generating independent sub-band data at the transmitter and processing the sub-bands in parallel at the receiver. Each sub-band is independently processed by means of its own sub-band receiver. The partitioning into sub-bands at the receiver (Rx) is performed by means of filter-banks [1][2][3][4].

Unrelated to filter banks, an equivalent form of sub-banding may be achieved in the OFDM transmission context by applying extra processing in the transmitter (Tx) and Rx, referred to as DFT-Spreading. DFT-spread (DFT-S) OFDM is a variant of OFDM transmission ported into optical communication by Shieh et al [5], simulated in [6][7][8] and experimentally demonstrated [9][10]. This variant of coherent optical OFDM has been shown to provide advantages over conventional OFDM, in PAPR reduction and higher nonlinear tolerance.

The complexity of the DFT-Spread OFDM transmission may be significantly reduced by introducing in the Rx filter-bank based sub-banding, efficiently implemented by under-decimation [2] [3] [4]. Each sub-band output of the filter bank is then followed by a DFT-S OFDM sub-band receiver. The complexity reduction in this approach, relative to a conventional DFT-S OFDM full-band Rx is attested by our real-time FPGA realization [2] [3] [4] of a 25 Gbaud 16-QAM single channel Rx. Performance-wise, digital sub-banding at the Rx is superior to a "full-band" conventional approach in almost every respect, as surveyed in [2][3][4]. It turns out that the only receiver impairment which is actually worsened by sub-banding is laser phase noise (LPN). To see why laser linewidth tolerance is degraded by the sub-banding inherent in DFT-S OFDM (whether or not filter-banks are used at the Rx), notice that for twice-under-decimated system with M sub-bands [2][3][4] the sampling rate per sub-band is reduced by a factor of M/2 relative to the full channel sampling rate. Recalling that the laser phase trajectory is a Wiener-Levy process (random walk), the M/2 longer interval between successive samples implies M/2 larger variance of the phase noise increments. Effectively, the laser linewidth tolerance is degraded by the M/2 factor. Thus, laser linewidth tolerance stands out as the last frontier of improvement of filter-bank based sub-banding. If the LPN tolerance were to be improved, filter-bank based sub-banding realization of DFT-S OFDM would become preferable in all respects to conventional full-band approaches.

It is the objective of this paper to propose, analyze and simulate a novel differential precoding (DP) at the Tx and Multi-symbol Differential Detection (MSDD) phase recovery [11][12] [13] [14] at the Rx, with significantly improved laser phase noise tolerance, relative to alternative conventional phase recovery schemes, which are applicable in the DFT-S OFDM context. In fact, the new carrier recovery structure pertains to both conventional full-band and sub-banded DFT-S OFDM receivers, though our main interest is in DFT-S OFDM systems using filter-bank based sub-banding in their receivers [2] [3] [4].

Our new phase-recovery method is based on interleaving at the Tx and de-interleaving at the Rx. The new interleave pre-processing is non-redundant, incurring no extra overhead, neither degradation in spectral efficiency, nor extra computational efficiency. The idea is simple, yet effective. Temporally successive differentially precoded symbols in the Tx are assigned by the new interleaver to adjacent spectral sub-bands, concurrently in time. Therefore, as these symbols are simultaneously launched into the fiber, they experience the same laser and nonlinear phase noises. Their common phase noise is then largely cancelled out by the MSDD in the Rx. Another view is that each sub-band acts like an "RF pilot", a phase reference, for its successive neighboring sub-band, which is differentially precoded relative to its neighboring sub-band. This amounts to differential precoding along the frequency axis rather than in time. However, unlike the case of phase noise reduction by means of an RF pilot tone, which requires guard-bands around the pilot, here there is no spectral overhead incurred, as each sub-band acts both as "pilot" (phase reference) for the neighboring sub-band, while also full-filling its data-carrying role. It is the combination of differential precoding and non-redundant interleaving that makes this concept feasible, despite each "pilot" being itself modulated with data.

DFT-S OFDM Overview

The DFT (de)spreading idea includes of introducing arrays of (I)DFTs ahead (after) of the main (IDFT) DFT in the OFDM transmitter (receiver) [5] [6] [7] [8]. The larger MN-pnt IFFT in the Tx and its FFT counterpart in the Rx, as conventionally used in OFDM, are referred to here as main (I)DFTs. The DFT-S OFDM scheme augments conventional OFDM with spreading-DFTs at the Tx and despreading-IDFTs at the Rx. These (de)spreaders are smaller N-pnt DFT-s preceding the main IDFT in the Tx. In the Rx, an array of M−1 N-pnt IDFT-s follows the main MN-pnt DFT (there are in principle M of each but we shall just use just M−1 active de-spreading-IDFTs). The Tx system is a mirror image of the Rx one. Each (de)spreading (I)DFT pair effectively defines a spectral sub-band (SB), carrying a fraction 1/M (in our case 1/(M−1)) of the allocated channel bandwidth). Upon placing the DFT-S OFDM Tx and Rx back-to-back, it is evident that the main DFT→IDFT yields an identity system, as the inner main IDFT and DFT cancel out, effectively bringing each spreader-DFT back-to-back with its corresponding de-spreader IDFT, with mutual cancellations of the (de-)spreader (I)DFTs, providing perfect reconstruction within each of the M DFT-S sub-bands.

The reason that we use M−1 rather than M sub-bands is that the extreme SB is dedicated to the DAC(ADC) anti-aliasing (anti-imaging) filter, hence does not require (de) spreading (I)DFT, as elaborated next.

The motivation for augmenting plain OFDM with (de) spreading, is mitigating of PAPR and nonlinearity, which are substantial impairments afflicting conventional OFDM. The down-side of DFT-S OFDM is its enhanced phase noise, the mitigation of which is addressed in this paper.

DFT-S OFDM Filter-Bank Based System

Figure 2:
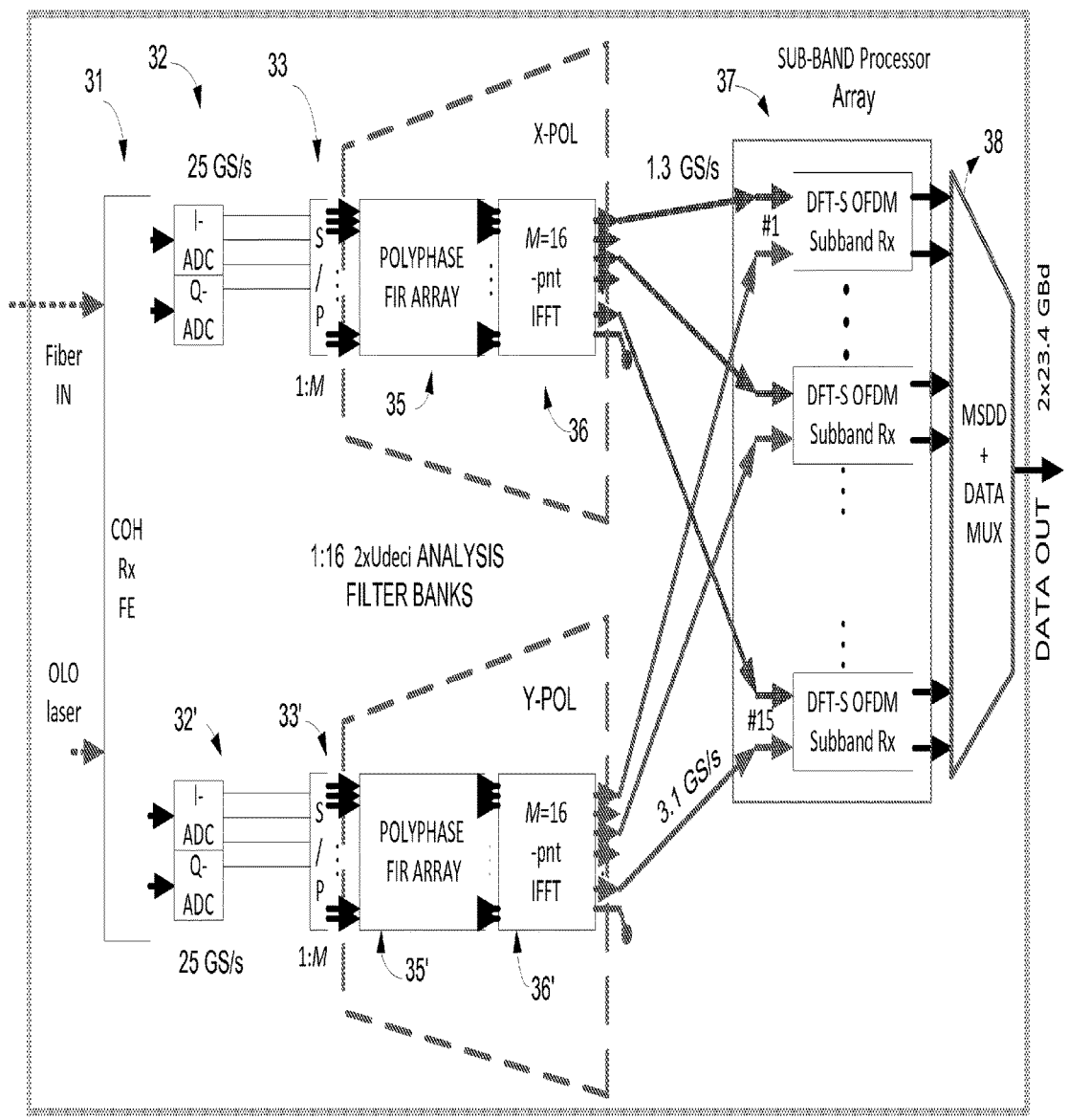
FIG. 2 illustrates a filter bank based sub-banded receiver.

The combination the de-spreading DFTs array and the main IDFT in the Tx may be viewed a frequency-domain multiplexer (MUX), taking M−1 single-carrier sub-channel inputs, modulating them upon distinct spectral sub-bands and superposing the sub-band signals in a composite time-signal output. The Rx performs the inverse function, that of a demultiplexer (DEMUX) separating the aggregated channel into its original constituent sub-bands. Notice however, that this Rx DEMUX is actually cyclic in frequency (as it includes of the cascade of a main DFT followed by de-spreading DFTs, acting block by block, which is not true linear-time-invariant (LTI) filtering, as it implements circular rather than linear convolutions). This implies that the DEMUX is unable to cope with chromatic dispersion (CD) whenever the CD delay spread exceeds the duration of the OFDM cyclic prefix (CP). For long-haul links, to avoid excessive CP, it is possible to use a separate frequency-domain-equalizer (FDE) preceding the DFT-S OFDM receiver in order to reduce the CP overhead (the so-called Reduced Guard Interval (RGI) OFDM strategy). Unfortunately the computational complexity of the FDE, which is usually implemented by overlap-save (OLS), becomes excessive for long-haul links. A preferred solution to mitigate CD as well as PMD is to use under-decimated filter banks [2] [3] [4] in the DFT-S OFDM Rx, essentially slicing the received spectrum into multiple sub-bands by a bank of true LTI bandpass filters, and inserting de-spreading DFTs in each of the filter-bank sub-band branches. This solution saves computational complexity and features other advantages. Notice that from the view-point of phase recovery it does not matter whether the Rx sub-banding is performed by the main DFT+de-spreading IDFTs based DEMUX (as in a conventional DFT-S OFDM Rx) or alternatively the DEMUX is rather implemented as a filter-bank, as depicted in the realization of FIG. 2. In FIG. 2 a coherent receiver front end 31 receives a fiber in input and an OLD laser input and outputs X-pol signals to I-ADC and Q-ADC 32 followed by serial to parallel converter 33 that is followed by a polyphase FIR array 35 that is followed by M (for example 16) points IFFT 36 that is coupled to multiple DFT=S OFDM sub-band receiver module 37 that are followed by a MADD+DAT multiplexer 38. In FIG. 2 the coherent receiver front end 31 also outputs Y-pol signals to I-ADC and Q-ADC 32' followed by serial to parallel converter 33' that is followed by a polyphase FIR array 35' that is followed by the M (for example 16) points IFFT 36.

Figure 3:
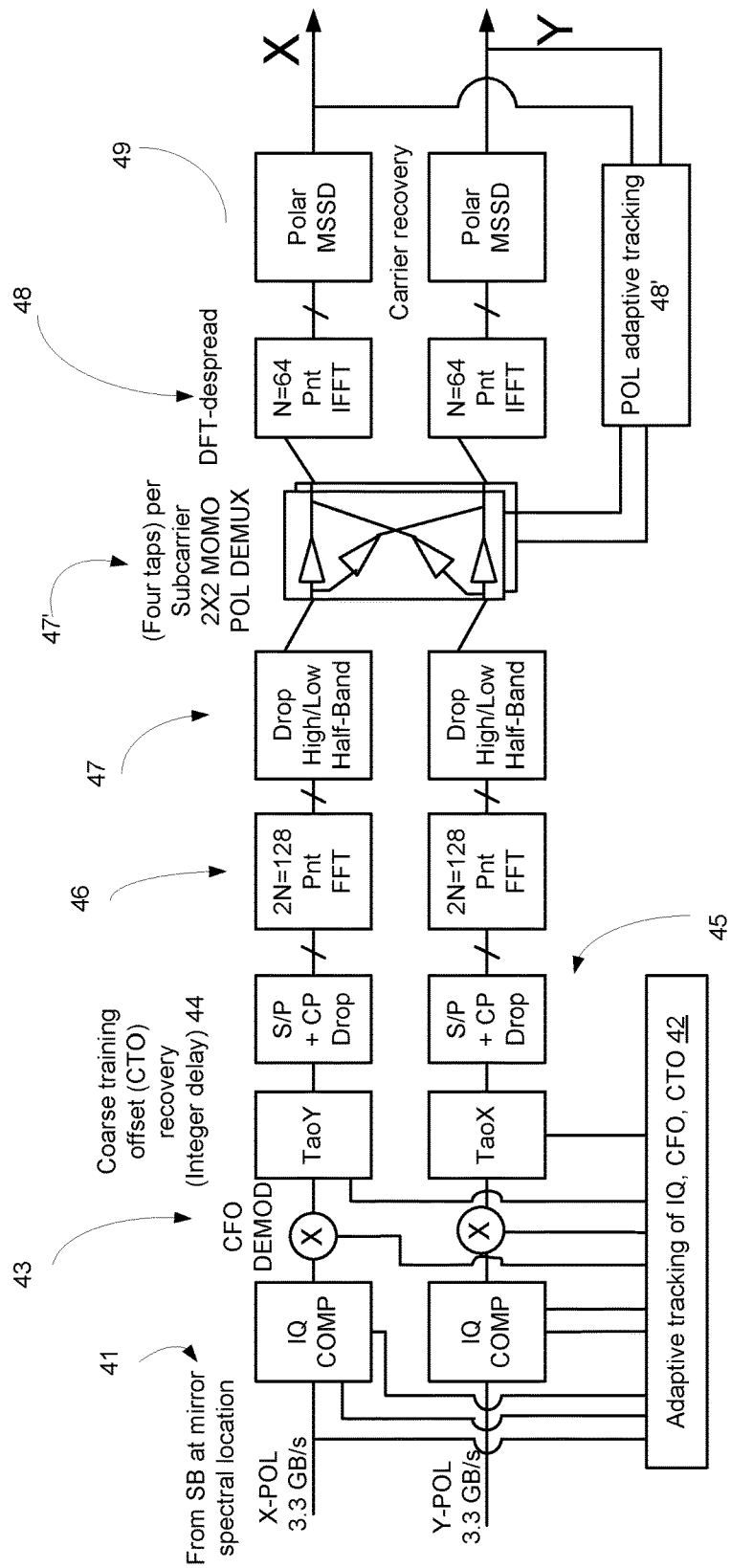
FIG. 3 illustrates a sub-band receiver processor for DFT-OFDM.

In the last mentioned case, each of the sub-band DFT-S OFDM receivers (the internals of which are shown in FIG. 3) just contains a de-spreading DFT.

In FIG. 3 there are two branches—an X polarization (X-POL) branch and a Y polarization (Y-POL) branch. Both branches include separate IQ comp 41 that is followed by CFO demodulator 43 that is followed by coarse training offset recovery 44 that is followed by serial to parallel and cyclic prefix drop 45 that is followed by 2N point FFT 46 that are followed by drop half band 47. Both drop half band are followed by 2×2 MIMO POL demultiplexer 47 that is followed by a pair of N point FFT 48 that are followed by a pair of polar MSDD 49.

The main DFT of a conventional DFT-S OFDM Rx is now replaced by the filter bank (one for the X- and one for the Y-polarization, as shown in FIG. 2). The two methods are equivalent in their phase noise properties and they are both in need of improvement of their phase noise tolerance, as pursued in this paper.

Mathematical Model of DFT-S OFDM

Half-Wave (I)DFT and Bi-Polar Indexing Notation

FIG. 1 presented a symmetrized "bipolar" version of the DFT-S OFDM description, slightly differing from the conventional one [8] in that the DC component of the complex envelope (corresponding to the optical carrier) is positioned at the center of the input vector of the main (I)DFT rather than at its left end. In FIG. 1 the transmitter 10 includes multiple (M−1) serial to parallel converters followed by multiple (M−1) N-points FFT converters that are followed by a M*N point IFFT 13 that is followed by a cyclic prefix and parallel to serial converter (CP add+P/N) 14 that is followed by a transmission module that may include digital to analog converter and a electro to optical converter such as a laser and a modulator (D/A+E/O) 15. In FIG. 1 the receiver 30 includes a reception module that may include an optical to electrical converter and an analog to digital converter (O/E+A/D) 31 that is followed by synchronizer and cyclic prefix drop and serial to parallel converter 32 that is followed by M*N point FFT 33 that is followed by a single tap equalizer (1-tap EQZ) 34 that is followed by multiple (M−1) N-points IFFT converters 35 that are followed by multiple (M−1) parallel to serial converters 36.

The receiver 30 is coupled via a communication link such as fiber 20 to transmitter 10.

In a conventional IDFT of size D (for even D), the first (last) D/2 input points correspond to positive (negative) frequencies. The samples of the IDFT input vector are referred to as sub-carriers (SC) and are conventionally labeled i=0, 1, . . . , D−1. For our purposes, we introduce a modified version of the D-pnt (I)DFT, referred to here as Half-Wave (HW) (I)DFT, whereby the two halves of the D-pnt input vector are interchanged (or the input vector is cyclically shifted by D/2), such that the negative frequencies now come first, followed by the positive frequencies, providing a more physically natural spectral representation. The SCs of the HW (I)DFT are now labeled by a bi-polar index, i=−D/2, −D/2+1, . . . , −1, 0, 1 D/2−1, for even D, whereas for odd D, i=−(D−1)/2, −(D−1)/2+1, . . . , −1, 0, 1, . . . (D−1)/2−1. The DC point now occurs in the middle of the input spectral band, indexed i=0 for odd D. When D is even, the DC point is virtual, falling half-way in between the two SCs of lowest absolute value of frequency (and opposite signs), which have respective indexes i=−1, 0.

The D/2 cyclic shift, interchanging of the two halves of the frequency-domain band, amounts to modulation of the time-domain signal by the phase factor $e^{j\pi k}=(-1)^k$. In the DFT-S OFDM context (FIG. 1), we replace the main IDFT by a HW-IDFT OFDM, implemented by either a half-wave (MN/2-pnt) circular shift at the IDFT input or alternatively by output sign alternation (FIG. 1) (with a dual expression for the HW-DFT):

$$\text{IDFT}_{HW}^{(MN)}\{A_i\}=(-1)_k\text{DFT}^{(MN)}\{A_i\} \quad (1)$$

The DFT-S sub-bands are now also bi-polarly labeled by m:

$$m \in -\frac{M}{2}, \underbrace{-\frac{M}{2}+1, \ldots, -1}_{\frac{M}{2}-1 \text{ terms}}, 0, \underbrace{1, \ldots, \frac{M}{2}-1}_{\frac{M}{2}-1 \text{ terms}} \quad (2)$$

We use negative indexes for sub-bands over the negative frequencies (lower half) of the HW-IDFT. The SB tagged[(0)] (m=0) is the center one, with its midpoint coinciding with the DC point of the HW-IDFT. The SCs in its left(right) half have negative(positive) frequencies. The [(1)]sub-band spans over the successive N points of the input record (underneath the [(0)]SB in the figure), being the first SB entirely within the positive half of the channel spectrum. The very first SB, labeled by the most negative index, [(−M/2)], entails special treatment, wrapping around half-half between the extreme negative and positive frequencies, i.e., split half-half at the two extremes of the channel spectrum. This extreme SB is not used for data transmission but is rather allocated to the oversampling transition of the DAC image-rejection analog filter at the Tx and the ADC (DAC) anti-aliasing (anti-imaging) filter at the Rx (Tx). Thus, this extreme SB is not assigned a (de)spreading (I)DFT at all, but it is rather nulled out (zero-padded) at the main IDFT input. Therefore, upon using an MN-pnt main IDFT and having N-pnt SBs, the number of (de)spreading (I)DFTs and data-carrying sub-bands is M−1 rather than M. In fact, in our representation, each N-pnt spreading DFT is also taken as a HW DFT, i.e., it is preceded by an alternating signs modulator (likewise, the main IDFT is followed by an alternating signs modulator in order to form a HW-IDFT).

For concreteness, the parameters of our simulated system are already stated here, pertaining to the simulations of section IV: M=16 and N=64, thus the main (I)DFT size is MN=1024 and M−1=15 SBs are active, with the extreme sub-band consisting of the union of 32 points intervals at either end of the 1024-pnt frequency-domain record. The ADC/DAC sampling rate is $f_s$=25 GS/s, the oversampling factor is OSF=M/(M−1)=16/15 (as the extreme sub-band is used for the ADC/DAC transition), thus the channel baud-rate is $f_s$/OSF=23.44 Gbaud.

DSP Mathematical Analysis of DFT-S OFDM

To analyze DFT-S OFDM operation, we denote the elements of the m-th SB by $a_t^{(m)}$—these are the input samples $a_t^{(m)}$, t=0, 1, . . . , N−1 into the m-th spreading HW DFT (m-th branch of the Tx MUX), the output samples of which are denoted $\{A_t^{(m)}\}_{t=k}^{N-1}$. These N samples are applied to a portion of the MN-pnt input record of the main HW IDFT, the output of which may be shown to be given by:

$$S_k = \frac{1}{M}\sum_{m=-M/2}^{M/2-1} e^{j\frac{\pi}{M}(2m-\frac{1}{N})k}\sum_{t'=0}^{N-1} a_{t'}^{(m)} e^{j\frac{\pi}{N}t'} \text{dinc}_N\left[\frac{k-t'M}{M}\right] = \quad (3)$$

$$\frac{1}{M}\sum_{m=-M/2}^{M/2-1} e^{j\frac{\pi}{M}(2m-\frac{1}{N})k}\left\{\{a_{t'}^{(m)} e^{j\frac{\pi}{N}t}\}_{\uparrow M} \otimes \text{dinc}_N\left[\frac{t}{M}\right]\right\}_{t=k}$$

where ↑M denotes M-fold down-sampling and ⊗ discrete-time convolution and we denoted the Dirichlet kernel ("digital sinc") by:

$$\text{dinc}_N[u] \equiv \sin(\pi u)/\left[N\sin\left(\frac{\pi}{N}u\right)\right].$$

Now, M-fold down-sampling the overall output of the main HW IDFT (3) may be shown, after some algebra, to yield a remarkable key result:

$$S_{tM} = S_k \mid_{k=tM} = \frac{1}{M} \sum_{m=-M/2}^{M/2-1} a_t^{(m)} \quad (4)$$

Thus, the tM-th output sample of the Tx main HW-IDFT is obtained as the additive superposition (arithmetic average) of the M−1 time-samples in the corresponding t-th positions within each of the time-domain SB inputs (as labeled by the sub-band index m), which are fed into the spreading IDFTs.

Relation (4) turns out to be critical for understanding our phase recovery scheme. An alternative derivation of this interesting result is based on the property that M-fold sub-sampling the time-domain output of an MN-pnt IDFT is equivalent to folding (aliasing) its frequency-domain input with pitch MN/M=N, then taking an N point segment of the periodic folded spectrum (a sub-band) and applying onto it an N-pnt IDFT (which amounts to back-propagating each spreading DFT output and superposing the time domain inputs, retrieving (4)).

A. Brief Review of MSDD Phase Recovery

In this subsection we review the minimal Tx differential precoding (DP) and Rx MSDD concepts required in the sequel. For more thorough treatments of MSDD and its associated DP for QAM see [11][12] [13] [14], wherein we assert that phase recovery based on the latest polar version [13][14] of MSDD provides superior tradeoff between performance and complexity, relative to alternative carrier-recovery schemes.

For single-carrier M-QAM transmission (with QPSK as a special case), the Tx complex-valued information stream, $a_t$, is applied to a Modulus-Preserving DP specified as:

$$a_t = S_t a_{t-1}/|a_{t-1}| \quad (5)$$

where t is discrete-time as above, $S_t$ are the Tx information symbols, e.g., selected out of a QAM constellation, $a_t$ are the line symbols generated by the DP, applied to the DACs. Evidently, the DP module differentially precodes the phase, whereas the moduli of the QAM information signals (e.g., one of 3 values for 16-QAM) are transferred to the line symbols:

$$\angle a_t = \angle S_t + \angle a_{t-1}, |a_t| = |S_t| \quad (6)$$

If the Tx and Rx were to operate back-to-back and no impairments were ideally present ($r_t = a_t$, with $r_t$ the received complex samples), then optimal detection may just consist of converting $r_t = |r_t| e^{j\angle r_t}$ to polar form, extracting $\{|r_t|, \angle r_t\}$, then slicing $|r_t|$ as per decision boundaries corresponding to the possible moduli $|a_t|$ of the QAM constellation, yielding an estimate $|\hat{S}_t| = |\hat{a}_t|$ while in parallel processing $\angle r_t$ by a simple delay detector generating $$\angle \hat{S}_t = \angle r_t - \angle r_{t-1}, \quad (7)$$

then slicing the estimated phases $\angle \hat{S}_t$ according to the possible angles of the QAM constellation points at each modulus, in order to yield $\angle \hat{S}_t$ (with the pointed-hat denoting here the estimated (detected) symbol). The modulus and angle processing may be conceptually lumped into a single complex joint phase and amplitude recovery operation, $$\hat{S}_t = r_t r^*_{t-1}/|r_{t-1}| \quad (8)$$

Unfortunately, such differential (delay) detection subtracting the phases of successive samples results in roughly doubling the ASE white noise variance affecting the sampling. Thus, simple Delay Detection (DD) (8) is a sub-optimal decoding scheme, exacting a penalty. The MSDD concept is a generalization of DD, augmented by generating additional higher-lag phase differences of the received phases, $$\hat{S}_{t-1}^{(i)} \equiv \angle r_t - \angle r_{t-i}, i=1,2,\ldots,L \quad (9)$$

jointly processing these phase differences as detailed in [11] [12] [13] [14], which amounts to averaging out the white noise, hence mitigating its induced penalty. Note that the phase DD (7) is a special case of (9) for i=1, not taking advantage of white phase noise averaging. In MSDD, a longer duration L of the sliding processing window reduces the white phase noise but increases the penalty due to laser noise. For typical optical communication systems the optimal MSDD window is either L=8 or L=16.

The MSDD processing of the L past samples was conducted in the complex domain [11][12], generalizing (8)). In [11][12] we recently introduced a "polar-MSDD" version, establishing that it is more efficient to first convert the received symbol to polar form, $r_t = |r_t| e^{j\angle r_t}$, by means of a CORDIC module (with roughly the complexity of a single multiplier) then conduct all MSDD processing in the phase domain, by separately processing the angles $\{\angle r_t, \angle r_{t-1}, \angle r_{t-2}, \ldots, \angle r_{t-L}\}$ in order to generate a "cleaner" slicer angular input $\angle \hat{S}_t$, to which we simply adjoin $|\hat{S}_t| = |r_t|$, then slice $|\hat{S}_t| e^{j\angle \hat{S}_t}$ according to the QAM constellation. Notice a conventional DD would just differentially process $\{\angle r_t, \angle r_t\}$ as per (7)), thus MSDD is indeed a generalization of DD.

One rewarding property of the MSDD, useful in the sequel, is that of common-phase-cancellation. If the samples in the L+1-pnt moving window are affected by common phase noise, $\phi_0$, i.e. we receive $$\{\angle r_t + \phi_0, \angle r_{t-1} + \phi_0, \angle r_{t-2} + \phi_0, \ldots, \angle r_{t-L} + \phi_0\},$$

then MSDD performance is unaffected, since $\phi_0$ cancels out (this is evident in the special DD case of a two-point window (7)). Remarkably the polar MSDD [11][12] exhibits ultra-low complexity, being realized with no multipliers at all, just adders and logic, yet its performance penalty is just 0.15 dB away from that of the benchmark Blind-Phase-Noise (BPS) phase recovery scheme, which is extremely complex.

Inter- Vs. Intra-Multi-Symbol Delay Detectors

This section is the main one introducing our novel concept of improved phase recovery for DFT-S OFDM receivers without or with filter-banking.

DFT-S OFDM Phase-Noise Penalty

Figure 4:
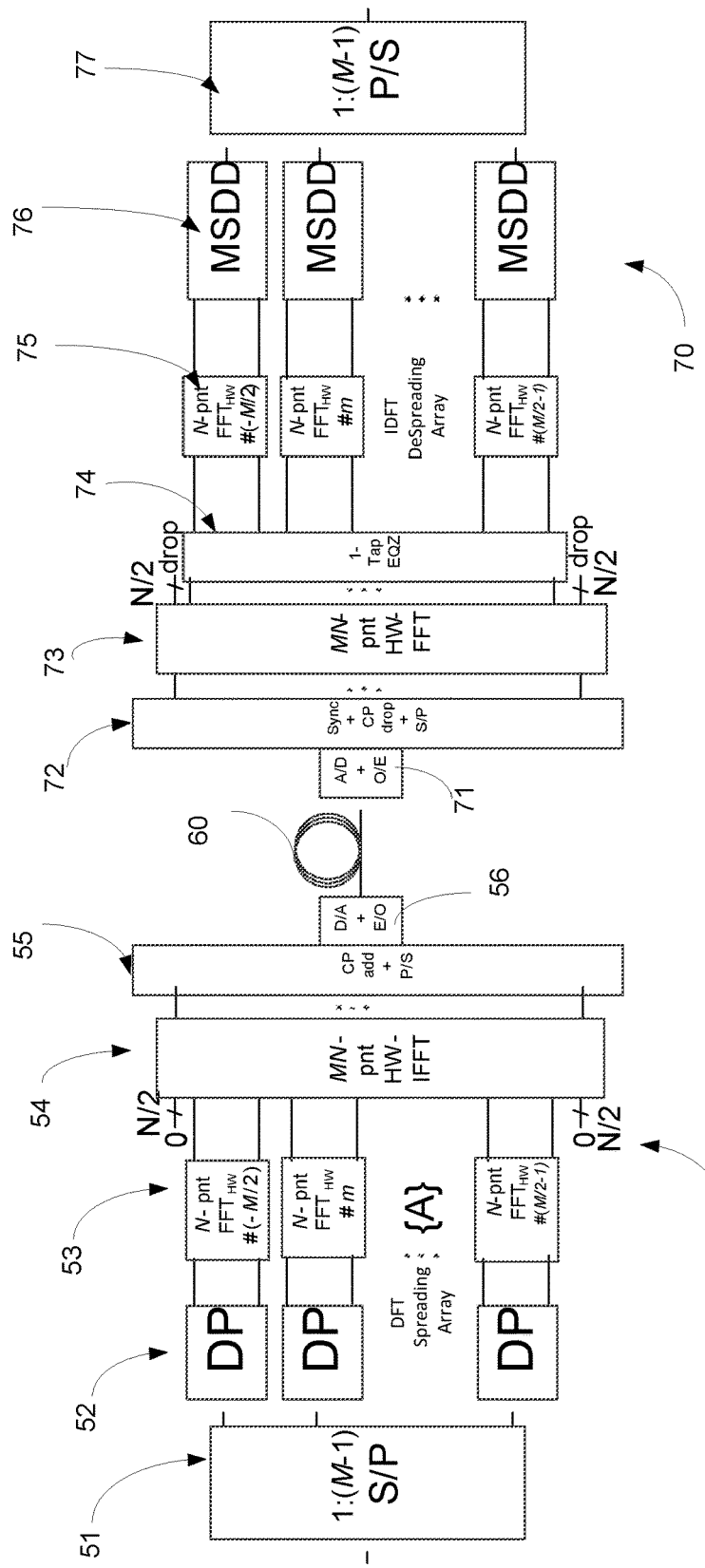
FIG. 4 illustrates an OFDM system having an intra-SB DP and MSDD.

As the DFT-S OFDM sub-bands carry independent sub-streams of data, the simplistic natural way to insert differential phase recovery in a sub-banded system would be to differentially precode each of the SBs separately in the Tx and accordingly, in the Rx, to separately phase recover the corresponding de-spreading (I)DFTs outputs (FIG. 4).

In FIG. 4 the transmitter 50 includes a one to M−1 serial to parallel converter 51 followed by multiple (M−1) differential precoders (DP) 52 that are followed by N-points FFT converters 53 that are followed by a M*N point IFFT 54 that is followed by a cyclic prefix and parallel to serial converter (CP add+P/N) 55 that is followed by a transmission module that may include digital to analog converter and a electro to optical converter such as a laser and a modulator (D/A+E/O) 56. In FIG. 4 the receiver 70 includes a reception module that may include an optical to electrical converter and an analog to digital converter (O/E+A/D) 71 that is followed by synchronizer and cyclic prefix drop and serial to parallel converter 72 that is followed by M*N point FFT 73 that is followed by a single tap equalizer (1-tap EQZ) 74 that is followed by multiple (M−1) N-points IFFT converters 75 that are followed by multiple (M−1) MSDD modules 76 that is followed by a one to M−1 parallel to serial converter 77.

The receiver 30 is coupled via a communication link such as fiber 20 to transmitter 10.

In this approach, each received SB would be differentially detected in the Rx by means of a separate MSDD module, operating at reduced clock rate. Such sub-banded phase recovery strategy, referred to here as Intra-SB DP and MSDD ("intra" meaning "within each sub-band separately") is simple to implement in terms of processing hardware (HW) by taking advantage of the frequency domain parallelization inherent in sub-banded transmission, which partially precludes the need for time-domain parallelization of HW processing, providing a preferred HW realization alternative.

Unfortunately, irrespective of the type of carrier recovery, e.g., [15]-[19], [21]-[24], we have a problem upon applying carrier recovery to DFT-S OFDM transmission separately per sub-band. Performance-wise, when using Intra-SB phase precoding and decoding, the reduced sampling rate in each sub-band degrades the phase noise tolerance relative to a reference system operating at the full channel sampling rate. This is due to the reduction in sampling rate per sub-band, as outlined in the introduction, wherein it was pointed out that a slower sampling rate entails a phase noise penalty. This reduced phase noise tolerance is a disadvantage of the DFT-spread version of OFDM with or without filter-bank based reception, arising whenever simplistic intra-SB phase recovery is resorted to. Evidently, using a robust and simple carrier recovery scheme such as the MSDD is recommended in any case, however additional measures are called for in the context of the DFT-S structure, aiming to partially mitigate the LPN tolerance degradation by means of some innovative joint processing of the individual sub-bands.

Inter-SB MSDD for DFT-S OFDM

There is provided a phase recovery method for 16-QAM coherent transmission (of any other coherent transmission scheme), based on the combination of non-redundant (de)interleaving, differential precoding and multi-symbol delay detection (MSDD), applicable to either conventional DFT-S OFDM receivers or to filter-bank sub-banded DFT-S OFDM receivers. Laser and nonlinear phase noise tolerances are significantly improved, as simulated for a filter-bank based sub-banded DFT-S OFDM receiver for 16-QAM over 1000 km SMF.

The LPN tolerance degradation problem is resolved by means of data interleaving structures following the DP in the Tx and preceding the MSDD in the Rx. The Tx interleaver effects certain permutations of the incoming blocks of data and the sub-carrier ports of the (de)spreading (I)DFTs. The Rx de-interleaver undoes the data permutation effected by the Tx interleaver. The usage of these custom (de)interleavers incurs no extra computational cost, yet significantly improves phase noise tolerance.

Figure 5:
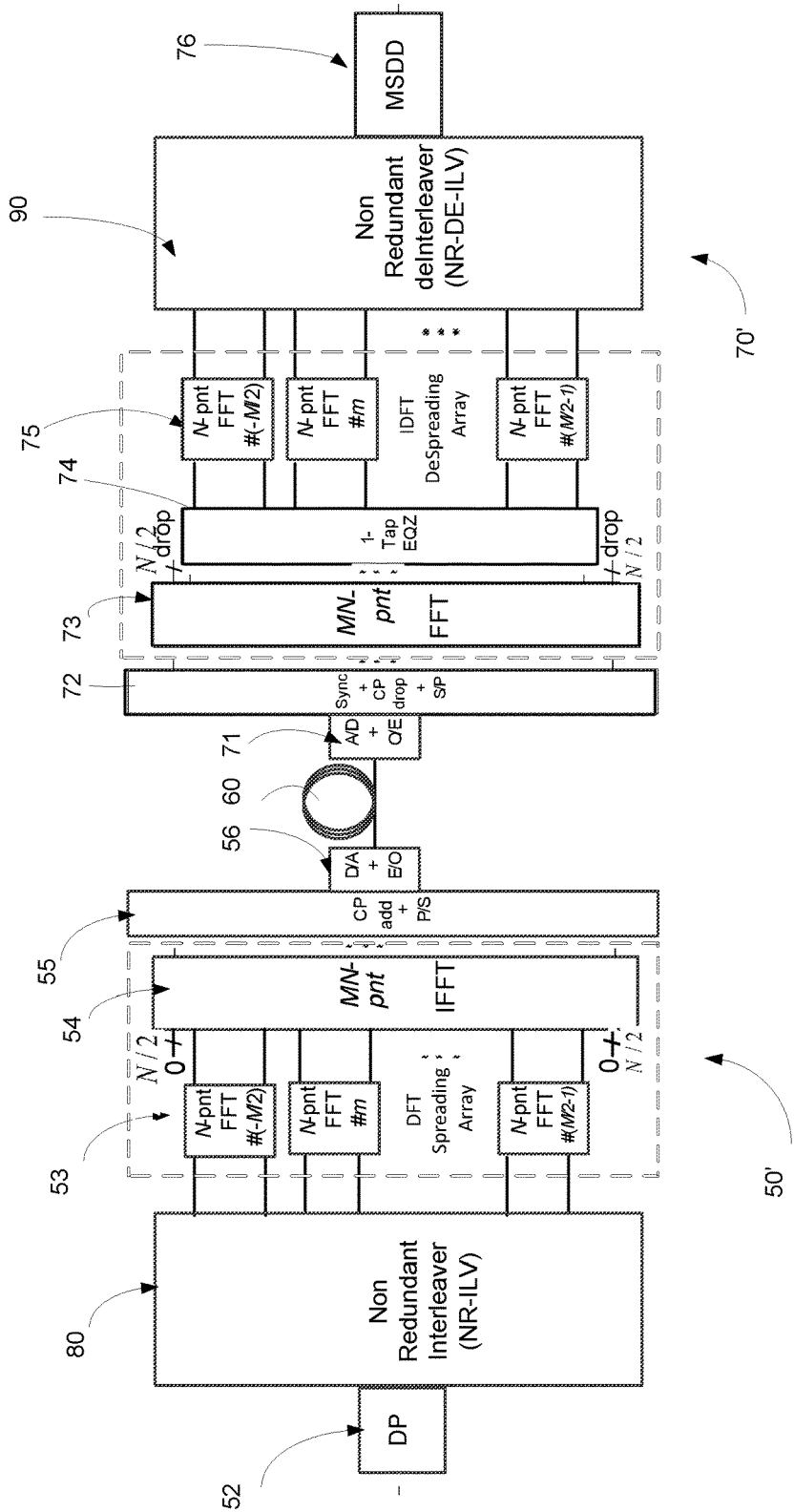
FIG. 5 illustrates an OFDM system having an inter-SB DP and MSDD according to an embodiment of the invention.

The proposed alternative phase recovery system, referred to here as inter-sub-band (inter-SB) DP and MSDD, is depicted in FIG. 5. This DP and MSDD phase recovery system is applicable to both conventional and filter-bank based versions of the DFT-S OFDM Rx.

The Intra-SB MSDD scheme of FIG. 4 is used as a baseline reference system against which the new Inter-SB system is to be compared. As implied by its name, the inter-SB system differentially precodes the Tx data between sub-bands, more specifically between corresponding samples belonging to successive sub-bands (rather than within each sub-band as in the Intra-SB scheme). The next sub-sections overview the new DSP structures and their key principle of operation.

Topology of the Inter-SB Proposed Solution

The structures of the inter-SB Tx and Rx (FIG. 5) are similar to those of the conventional intra-SB system (FIG. 4), the only topological difference consisting in the respective placements of the DP and MSDD modules within the processing chain and the replacements of the S/P and P/S in FIG. 4 by (de)interleavers in FIG. 5 (in fact we shall soon see that the (de)-interleavers are just generalized forms of S/P and P/S). In the new inter-SB scheme, the DP is placed at the full channel rate level, preceding the Tx interleaver. The MSDD module, following the Rx de-interleaver, also operates at the full channel rate level.

In FIG. 5 the transmitter 50' includes a differential precoder (DP) 52 that are followed by an interleaver 80 (such as a non-redundant interleaver) that is followed by a symbol processor that includes multiple N-points FFT converters 53 that are followed by a M*N point IFFT 54 that is followed by a cyclic prefix and parallel to serial converter (CP add+P/N) 55 that is followed by a transmission module that may include digital to analog converter and a electro to optical converter such as a laser and a modulator (D/A+E/O) 56. In FIG. 4 the receiver 70' includes a reception module that may include an optical to electrical converter and an analog to digital converter (O/E+A/D) 71 that is followed by a symbol processor that includes a synchronizer and cyclic prefix drop and serial to parallel converter 72 that is followed by M*N point FFT 73 that is followed by a single tap equalizer (1-tap EQZ) 74 that is followed by multiple (M−1) N-points IFFT converters 75. The multiple (M−1) N-points IFFT converters 75 are followed by a de-interleaver 90 (such as non-redundant interleaver) that is followed by a single MSDD module 76.

Figure 6:
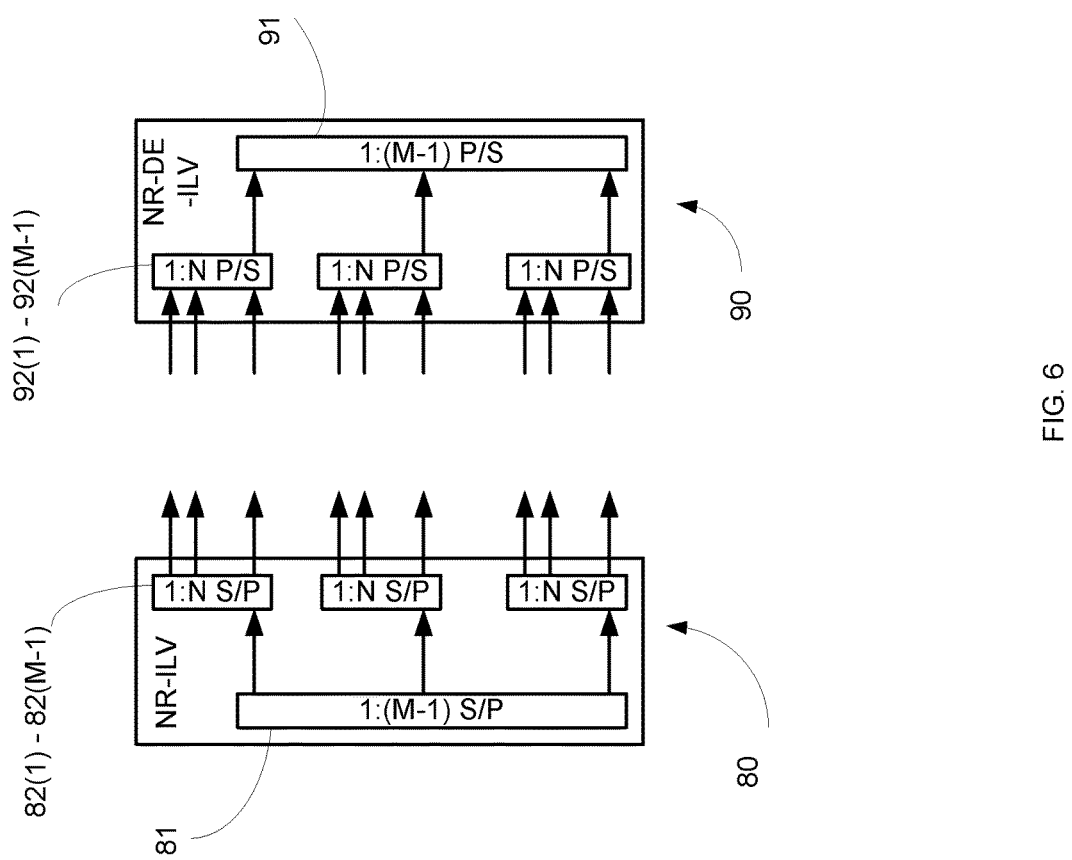
FIG. 6 illustrates an interleaver and a de-interleaver of the system of FIG. 5 according to an embodiment of the invention.

The (de)-interleaver structures are described in FIG. 6. The Tx interleaver 80, fed by the DP module output, simply includes of a 1:(M−1) Serial to Parallel (S/P) module 81, followed by multiple 1:N S/P modules 82(1)-82(M−1). Notice that this cascade of S/Ps is not equivalent to a single 1:(M−1)N. Indeed, the input to outputs slow-down ratio in both options is by a (M−1)N factor, nevertheless, the blocks of samples generated by the two alternative S/P structures are relatively permuted.

The Rx de-interleaver is the mirror image of the Tx interleaver. It includes of N:1 P/S modules 92(1)-92(M−1), respectively fed by the de-spreading N-pnt IDFTs outputs, followed by a (M−1):1 P/S module 91 with serial output feeding the MSDD input (this is a conceptual structure—in practice as the MSDD is also parallelized, the last P/S module may not be needed or may be made of smaller dimension).

Notice that the computational complexities of the two schemes (inter-SB vs. intra-SB) are identical. Indeed, in the new inter-SB scheme of FIG. 5, the single DP and MSDD operate at M−1 times faster rate than that of the multiple DPs and MSDDs (M−1 of them) in the intra-SB scheme of FIG. 4. The M−1 slower modules generate the same number of operations per unit time as the single, M−1 times faster, module.

Let us define a superframe (SF) as a block of (M−1)N data samples, which end up permuted by the Tx interleaver onto the juxtaposition of the M−1 inputs of the N-pnt spreading-DFTs (the respective outputs of which are juxtaposed to feed the (M−1)N sub-carrier center inputs into the main MN-pnt IDFT). Thus, a superframe is defined as an MN-pnt block at the DP output, synchronized with the cascade of the two S/P units (the interleaver) such that it gets permuted onto the inputs of the spreading-DFT array. A superframe is composed of M−1 frames. Each frame is associated with a sub-band, comprising N samples, feeding each of the M−1 spreading-DFTs.

Overview of the Inter-SB Scheme Principle of Operation

In the next sub-section we show that, within each Tx superframe, all the input frames corresponding to various sub-bands are simultaneously transmitted in time (evidently at different frequencies), by virtue of the new interleaving scheme. This is plausible, as the sub-band frames are spectrally superposed, but are temporally indistinguishable within a particular superframe, as they are spatially laid out by the interleaver, onto the inputs of the spreading DFTs, which processes them at once. This indicates that the inter-SB scheme eliminates the protracted sampling intervals between successive samples along the time axis within each sub-band, as occurring in Intra-SB. The Inter-SB differential precoding and decoding of certain sets of samples is now effected along the frequency axis rather along the time axis which is the case in intra-SB. Such temporally-concurrent processing mitigates degradation due to time-domain decorrelation of the phase noise.

Let us now briefly discuss phase temporal decorrelation of laser phase noise. This effect stems from the random-walk Wiener-Levy LPN process having the independent stationary increments property: $\phi_{t+\tau}=\phi_t+\Delta\phi_{[t,t+\tau]}$ where the phase increment $\Delta\phi_{[t,t+\tau]}$ is statistically independent of $\phi_t$ and has linearly growing variance over time (proportional to the laser linewidth $\Delta v_{FWHM}$): $\sigma_{\Delta\phi_{[t,t+\tau]}}^2 = 2\pi\Delta v_{FWHM}|\tau|$. The variance of the phase increment is a measure of the decorrelation between the phase samples at times t, t+τ. The accuracy of predicting the phase at t+τ from a measurement at t, diminishes when the interval r between the two samples is increased. This temporal decorrelation effect of the LPN is formally captured by the statistical correlation coefficient between the Wiener-Levy phases at t, t+τ, evaluated as follows:

$$\rho(\tau:t) = \frac{\langle\phi_t^2\rangle}{\sqrt{\langle\phi_t^2\rangle\langle\phi_{t+\tau}^2\rangle}} = \sqrt{\frac{\langle\phi_t^2\rangle}{\langle\phi_{t+\tau}^2\rangle}} = \frac{1}{\sqrt{1+\tau/t}} \quad (10)$$

In particular, we have $\rho(iT_s;T_s)=1/\sqrt{1+i}$, interpreted as the decorrelation occurring when two adjacent samples spaced $T_s$ are replaced by farther-away samples, separating out the pair of samples by i discrete-time units at rate $T_s^{-1}$ (the MSDD processes all the phase differences between samples spaced by various intervals $iT_s$, where i satisfies 2≤i≤L+1).

The idea in the inter-SB phase recovery is to reduce the phase temporal decorrelation by effectively inducing zero lag, τ=0, between most of the pairs of samples within each frame, having them differentially precoded in frequency but concurrently in time (note that for i=0 or τ=0 we have ρ(0; $T_s$)=1, perfect correlation). The tradeoff here is that time-concurrent samples are now imparted differing frequencies, thus while temporal decorrelation is effectively mitigated, we must now be concerned about potential frequency-domain phase decorrelation as an unwarranted side-effect. One mechanism via which such frequency-domain phase decorrelation may be generated, is the so-called Equalization-Enhanced Phase Noise (EEPN) [25] [26] [19] [20] whereby different frequencies pick up different dispersive delays, hence their phase noises indirectly get decorrelated in the time-domain (frequency-domain decorrelation is mapped into time-domain decorrelation due to the dispersive walkoff). The current proposed Inter-SB would then exacerbate EEPN. Fortunately, EEPN is a relatively small effect, less pronounced than the time-domain decorrelation which is the dominant LPN impairment effect. Indeed, as borne out by our simulations (section IV), we attain a large overall improvement, suggesting that mitigating time-domain decorrelation via the Inter-SB apparently more than offsets the enhancement in phase noise degradation due to the EEPN effect.

Realization of the Inter-SB Scheme: (De)Interleaving

Fortunately, the new inter-SB scheme does not increase complexity of HW realization. The computational complexities of inter-SB vs. intra-SB methods are identical as discussed in sub-section C. As for actual HW implementation of the new Inter-SB scheme, in a practical HW processor realization, running the DP and MSDD at full channel clock rates is not currently feasible. The processing must be parallelized, which is best accomplished, at the block level, precluding parallelization penalty. Specifically, we may adopt the so-called polyblock parallelization method introduced in [13] for the DP and MSDD (and even demonstrated in real-time FPGA HW there), essentially processing multiple blocks of data in parallel by means of multiple slowed-down instances of the DP and MSDD modules. However, in the sequel, for the purpose of explaining the principle of operation, the DP and MSDD are conceptually shown as effectively operating at the full channel rate without parallelization.

Figure 7:
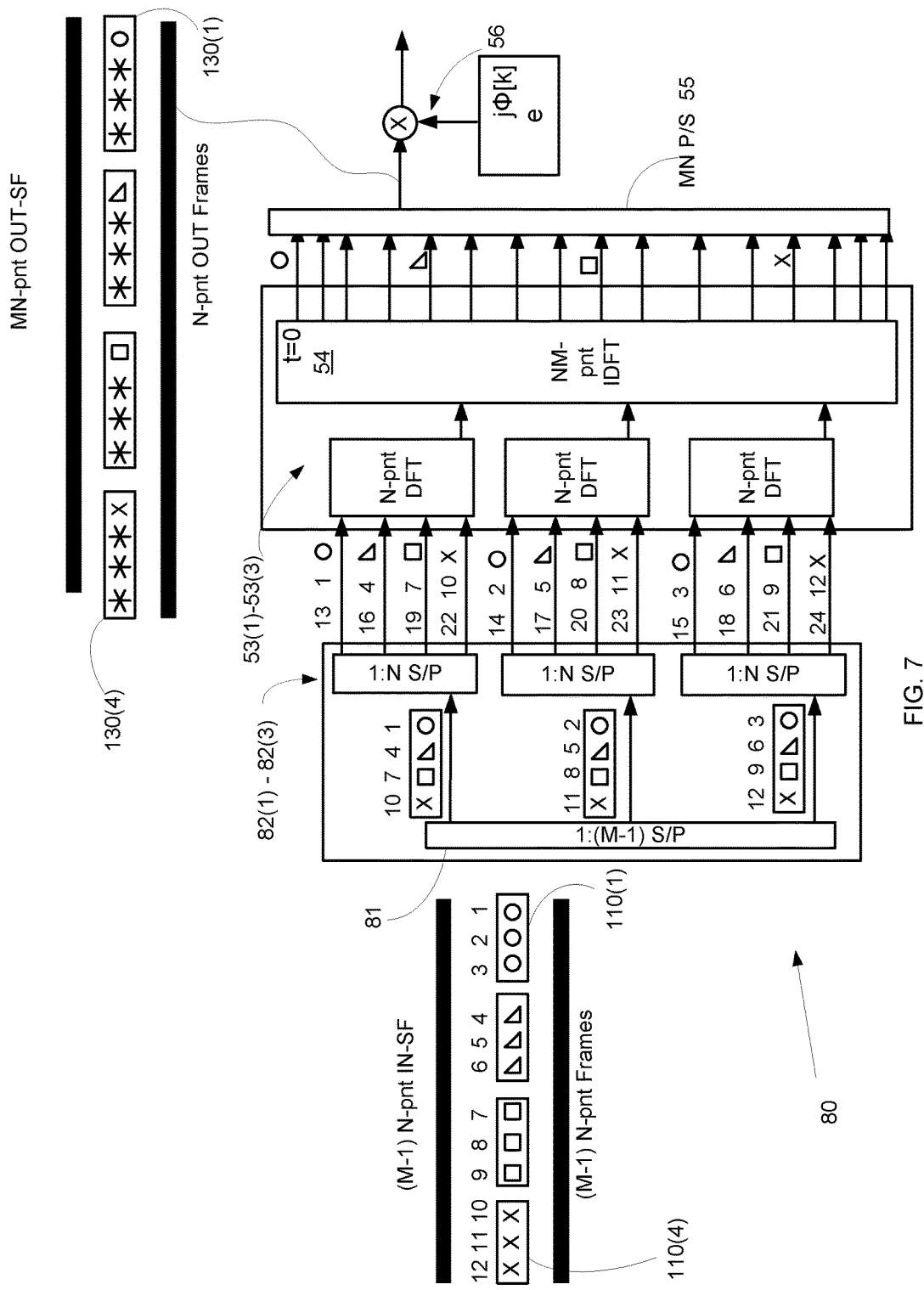
FIG. 7 illustrates an interleaver, a symbol processor and various symbols of the system of FIG. 5 according to an embodiment of the invention.

To explain interleaver operation, we follow the propagation of two superframes through the hierarchy of the two cascaded S/P modules composing the interleaver, first splitting 1:M−1, then followed by 1:N (FIG. 7). The objective is to identify, at the interleaver output (input of the spreading DFT array), the specific pairs of symbols which end up differentially precoded relative to each other. The integer numerals in the figure denote discrete-time indexes relative to some initial time marked 0, corresponding to the last sample of a superframe. Hence, the streaming samples at the DP output, have indexes 1, 2, 3, . . . , 11 for a first superframe and 12, 13, 14, . . . , 23 for a second superframe, emerging from the DP differentially precoded between samples with successive indexes (t+1 relative to t which serves as reference for t+1). Inspecting the sequence of indexes at the spreading DFT array inputs, the frequency-domain interleaving of samples is evident. Further note that all samples in the same superframe appear concurrently-in-time at the interleaver output. However, pairs of successive samples end up in successive sub-bands, but with the same SC index offset from the SB edge, except for end-effects, e.g. when a flyback occurs from the top SB to the bottom SB. To see this, just follow the count 1, 2, 3, . . . 11 at the spreading DFT inputs.

In FIG. 7 it is assumed that N=3 and M−1=4. An encoded superframe 110 includes encoded frames 110(1), 110(2), 110(3) and 110(4). Encoded frame 110(1) includes three symbols represented by four circles. Encoded frame 110(2) includes three symbols represented by three triangles. Encoded frame 110(3) includes three symbols represented by three rectangles. Encoded frame 110(4) includes three symbols represented by three X.

Three 1:N S/P modules 82(1)-82(M−1) represent three sub-bands. The order of output of each 1:N S/P module represent an order of frequencies within each sub-band.

Interleaver 80 places the three symbols of frame 110(1) at the first outputs of each one of the three 1:N S/P modules

82(1)-82(M−1), places the three symbols of frame 110(2) at the second outputs of each one of the three 1:N S/P modules 82(1)-82(M−1), places the three symbols of frame 110(3) at the third outputs of each one of the three 1:N S/P modules 82(1)-82(M−1) and places the three symbols of frame 110(4) at the fourth outputs of each one of the three 1:N S/P modules 82(1)-82(M−1). These outputs correspond to frequencies of the symbol processor. Adjacent symbols of the same frame are allocated to adjacent sub-bands. The symbol processor outputs a set of symbols 130(1), 130(2), 130(3) and 130(4) for each frame simultaneously to the transmission module.

Figure 8:
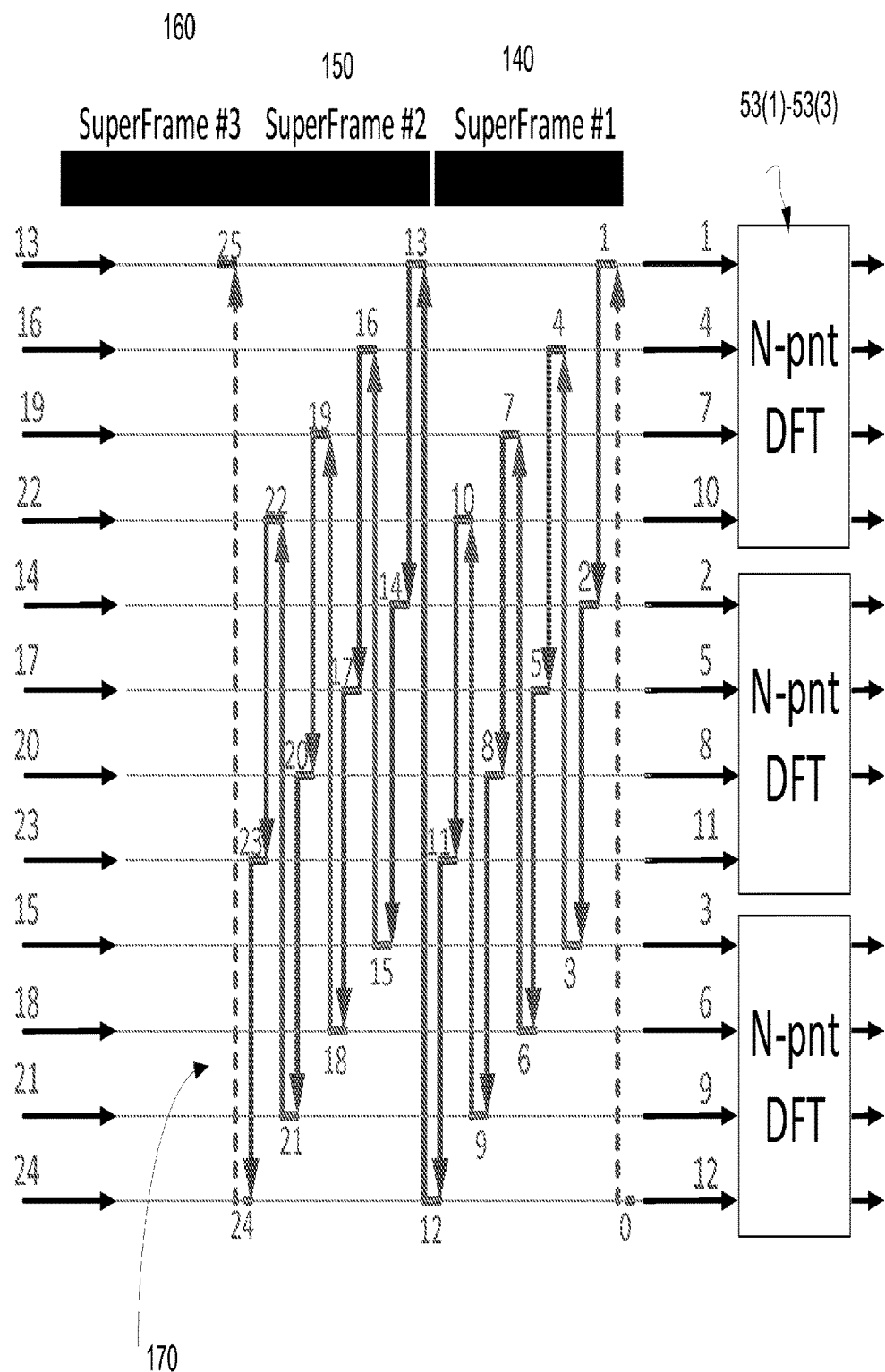
FIG. 8 illustrates a differential precoding according to an embodiment of the invention.

The DP referencing transitions are detailed in FIG. 8, following samples that were temporally successive at the DP output (but are now time-concurrent at the spreading DFT array inputs). In FIG. 8 symbols of three superframes 140, 150 and 160 are precoded by replacing the phase of a symbol by a phase difference between the symbol and the previous symbol. The phase differences are illustrated by arrows 170. The sample at the tail of the arrow acts as DP reference for the sample at the top of the arrow, in the sense of the DP rule (5). The sample at the arrow-head is obtained by complex-multiplying the sample at the arrow-tail by the current information symbol. There are three types of phase referencing transitions:

(i) intra-frame: to the next sub-band but with both samples having concurrently emerged from the DP within the same temporal superframe.

Therefore, the t-th sub-carrier (SC) in the m-th SB acts as reference for the t-th SC in the m+1-th sub-band (for all SBs but the last one (the SB with the most positive frequencies), i.e. for all $$m \neq \frac{M}{2} - 1$$

SB indexes).

This unconventional DP rule implies that each SB (except for the first one) is differentially precoded relative to the previous SB.

(ii) inter-frame: the last sample of a frame and the first sample of the next frame at the DP output are respectively mapped onto the last SB (the lowest spreading IDFT in the figure) and the first SB respectively, also with both samples having concurrently emerged from the DP within the same temporal superframe.

(iii) inter-superframe: the last sample of a superframe and the first sample of the next superframe at the DP output are also respectively mapped onto the last SB and the first SB respectively but with the sample in the last SB in one temporal superframe while the sample in the first SB belongs to a different temporal superframe.

The intra-frame transition ((i) above) justifies the term inter-SB, as the DP is now applied between adjacent SBs, all simultaneously in time, thus the DP is effectively performed in the frequency-domain between different frequency components but all at the same time. Indeed, the corresponding t-th SC inputs of the m-th and m+1-th SBs, which are mutually related by differential precoding, are input into the spreading DFT-s concurrently in time but are at different frequencies, as they belong to different sub-bands.

As mentioned above, the last SB is treated differently. It is actually used as reference for the first SB (the first active SB, indexed, $$m \neq -\frac{M}{2}$$

with the most negative frequencies), as reflected in the inter-(super)frame types of transitions.

The modified DP rule between the last SB and the first one is as follows: The t-th SC in the last SB acts as reference for the t+1-th SC in the first SB (for t=0, 1, 2, . . . , N−2, i.e., all SCs but the last one in the last SB). Thus, the references for the SCs of the first SB are obtained from the SCs of the last SB, albeit with SC index being one unit less. This last SB→first SB referencing process is the inter-frame transition (ii).

But how about the last SC of the last SB $$\left(m = \frac{M}{2} - 1, t = N - 1\right)?$$

Evidently, this element may no longer be reference to another one in the first SB (as there is no t+1=N element in the first SB). And how about the first SC of the first SB, $$\left(m = -\frac{M}{2}, t = 0\right)?$$

Where does this element get its reference from? As defined by the inter-superframe transition (iii), the last SC of the last SB is used as reference to the first SC in the first SB in the next superframe. Similarly, the first SC of the first SB in the current superframe recursively takes its reference from the last SC of the last SB in the prior superframe.

These three DP referencing maps readily follow by inspection of the propagation of samples via the interleaver structure.

In contrast, a similar DP referencing map for the conventional intra-SB differential precoding system would be more straightforward (but less efficient). The t-th SC of the m-th SB simply acts as reference to the t-th SC of the m-th SB in the next frame. Its referencing arrows are now horizontal (along the time dimension) rather than vertical (along the frequency axis). Unfortunately, as each superframe contains M frames, and the DP and MSDD operate in the Intra-SB scheme at a sampling rate twice the frame rate, the time elapsed between corresponding differentially precoded samples is (M−1)/2 slower than the channel symbol rate, implying a factor of (M−1)/2 higher phase noise variance than a reference DP and MSDD system operating at the full channel rate.

This highlights the intra-SB scheme phase noise impairment deficiency, largely circumvented in the inter-SB precoding scheme, wherein SCs pairs which originate from mutually differentially precoded successive symbols, occur at the interleaver outputs (and the memoryless MUX outputs) mostly concurrent in time, thus affected by common phase noise. This common phase noise is cancelled out by the MSDD differential scheme, as stated in section. The only instances when the laser phase noise is not cancelled are the inter-superframe transitions (the last SC of the last SB).

Approximate Analytical Model of Inter-SB Operation

Precise close-form modeling of Inter-SB operation is currently intractable, however in this section we present an approximate, hopefully insightful, mathematical argument, accounting for the improved LPN tolerance of the new Inter-SB scheme.

The DFT-S OFDM Tx may be viewed at its top level as composed of two main modules (FIG. 5), the interleaver (ILV) and the frequency-domain multiplexer (MUX), in turn comprising the spreading DFTs and the main IDFT. The Rx is the mirror image of the Tx, consisting of a demultiplexer (DE-MUX) followed by a de-interleaver (DE-ILV). FIG. 7 indicates the super frames (SF) at various locations in the Tx: the input SF (IN-SF), the ILV output SF (ILV-SF) and the MUX output SF (OUT SF) as generated at the main IDFT output in parallelized form and then serialized. The IN-SF comprises M−1 N-pnt input frames (IN-FR), thus the size of the IN-SF is (M−1)N. The MUX and DEMUX are inverse modules, as reviewed in section II, and so are the ILV and DE-ILV, hence in the absence of noise and other impairments the transmission chain attains perfect reconstruction. Using the terminology above, the results of the last section may be rephrased as follows:

The interleaver maps the m-th input frame into the m-th polyphase component modulo N of the ILV-SF.
(see [26] for a definition of the polyphase components of a sequence). Thus, the contiguous samples of each IN-FR appear as interleaved polyphase sub-sequences of the ILV-SF. Next, propagation through of the interleaved polyphases via the MUX is described by (4). The notation $a_t^{(m)}$ in (4), corresponds to the t-th polyphase component modulo N of the IN-SF (in our polyphase notation $a_t^{(m)}$=ILV-SF$^{[t]_N}$[m]). Thus, (4) is re-expressed as:

$$S_{tM} = \{S_k\}_{\downarrow M} = \frac{1}{M} \sum_{m=-M/2}^{M/2-1} ILV - SF^{(t)_N}[m] \quad (11)$$

Remarkably, the t-th polyphase modulo N sub-sequence of the ILV-SF uniquely determines the particular tM-th sub-sample of the OUT-SF. However, knowing the decimated tM indexed samples of the OUT-SF is not sufficient for the Rx to reconstruct the polyphase sub-sequences of the ILV-SF, as the linear transformation is undetermined (number of equations is lower than the number of unknowns) thus cannot be uniquely inverted. The Rx also needs to know the interpolated samples in between the sub-grid of Mt samples. The interpolated samples (3) are formed as linear combinations of polyphase components. For these interpolated samples we do not have a precise analytic model of the impact of phase noise, but we do for the M-fold decimated samples $s_{tM}$ of the OUT-SF, referred to as the primary sub-samples, as they determine the interim samples by interpolation. In the absence of phase noise the primary sub-samples of the OUT-SF are just given by (11):

The t-th primary sub-sample is a summation of all the elements of the t-th polyphase of the ILV-SF. Before, we have shown that the elements of the t-th polyphase of the ILV-S coincide with the elements of the t-th frame at the input:

$$ILV\text{-}SF^{[t]_N}[m]=IN\text{-}FR^{(t)}[m] \quad (12)$$

where IN-FR$^{(t)}$ [m] denotes the m-th element of the t-th input frame. Combining the last two statements, we substitute (12) into (11) yielding a relation graphically depicted in FIG. 7 by multiple arrows converging onto the sub-sampled outputs of the MUX module:

$$S_{tM} = \{S_k\}_{\downarrow M} = \frac{1}{M} \sum_{m=-M/2}^{M/2-1} IN - FR^{(t)}[m] \quad (13)$$

The t-th primary sub-sample at the ILV output is obtained by summation of the elements (indexed m) of the t-th input frame.

Now, the serialized OUT-SF, acts as input into the channel. For the purpose of understanding the impact on LPN, let us assume a simple memoryless phase noise channel model accounting just for the LPN (without additive white noise and ignoring the effect of chromatic dispersion (CD)):

$$r_{-k} = e^{j\phi[k]} s_{-k} \Rightarrow r_{-iM} = e^{j\phi[Mt]} s_{-iM} \quad (14)$$

wherein the second equation represents the M-fold sub-sampling of the channel output samples. Substituting (13) into the channel model (14) yields:

$$r_{\sim M} = \frac{1}{M} \sum_{m=-M/2}^{M/2-1} IN - FR^{(t)}[m] e^{j\phi[Mt]} \quad (15)$$

This result indicates that the primary sub-samples could be alternatively generated by assuming no phase noise in the channel, but having the elements IN-FR$^{(t)}$ [m] modulated by a common factor $e^{j\phi[Mt]}$ determined by the phase noise sample at time tM. Thus, we conclude that for the purpose of evaluating the primary sub-samples of the OUT-SF at the Rx, we may assume a phase-noise free channel and effectively represent the channel phase noise at the input by applying a common phase φ[Mt] onto all N elements of the t-th input frame.

Figure 9:
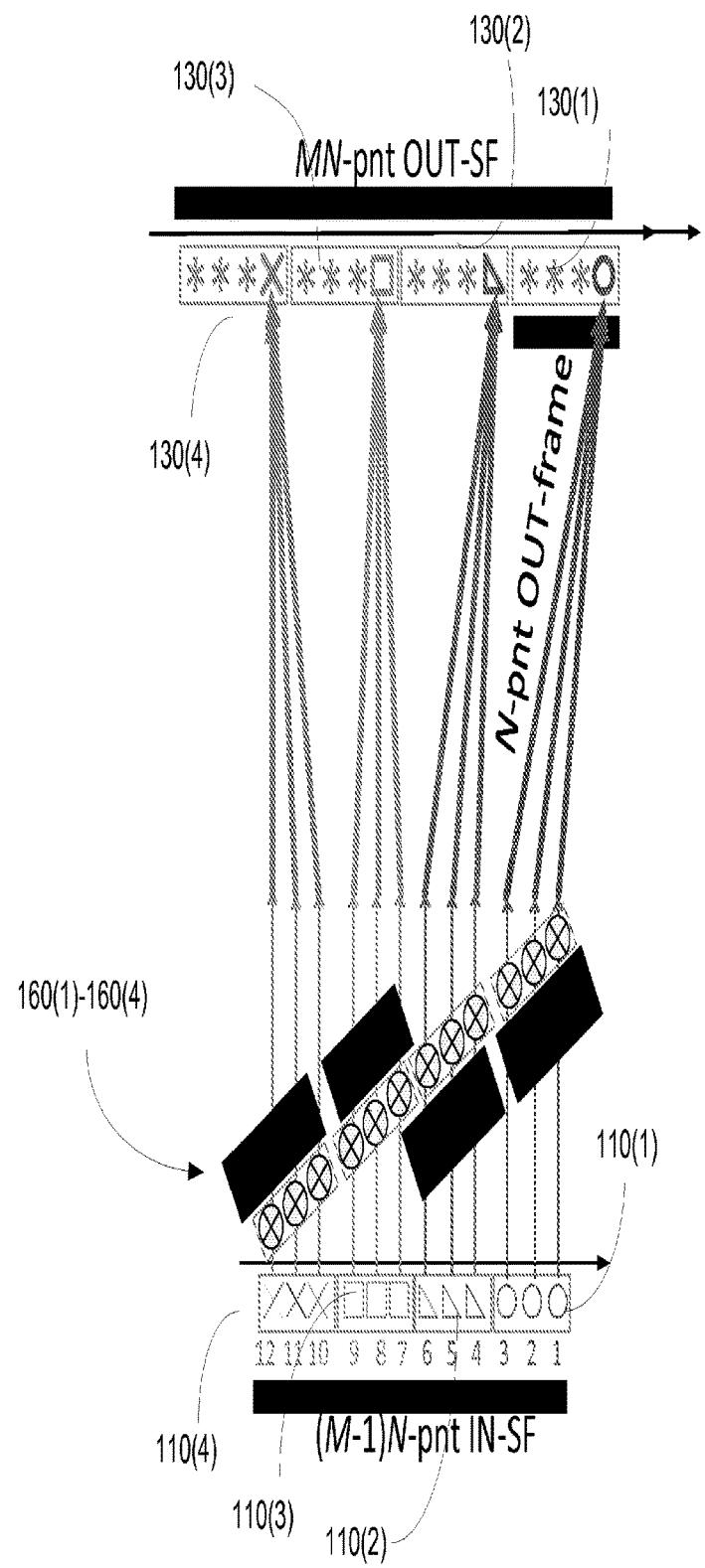
FIG. 9 illustrates phase noise properties according to an embodiment of the invention.

This process is graphically illustrated in FIG. 9. Each set of symbols per frame 130(1)-130(4) is subjected to the same phase noise 160(1)-160(4) respectively.

Thus, consider the transmission chain consisting of the Tx, the assumed phase noise free channel and the Rx, all the way to the OUT-SF at the DE-ILV output and having the elements of each input frame affected by its common phase φ[Mt] where t is the input frame index. Presumably this transmission chain models, at least approximately, the actual propagation in the presence of the phase noise.

In the Inter-SB based Rx, the OUT-SF is conceptually assumed serialized, and fed into the MSDD. Now, recalling the property of MSDD reviewed in section II-D, namely its ability of to cancel out common phase, it follows that the common phase φ[Mt] is effectively cancelled out by the MSDD.

There is however an inaccuracy hidden in the argument above. We have argued that we get perfect reconstruction, since the phase noise affecting the primary sub-samples effectively becomes common phase noise of the input frame. However, this argument ignores the impact of phase noise onto the interpolated samples in-between the primary sub-samples. Actually, having the samples of each Tx input frame effectively shifted by common phase noise does not yield the correct interpolated samples but only approximately so.

Unfortunately, it is not possible to further rigorously model the problem analytically. Nevertheless, the case can be made that many of the interpolated samples, in-between the primary ones, are affected by phase noise differing just little from the assumed common phase noise. E.g., consider a sample one or two samples away from a primary sub-sample. Such interpolated sample is, to good accuracy, expressible as a linear combination of the nearest primary sub-sample and a neighboring primary sub-sample. However, since the weight of the nearest primary-sub-sample in this linear combination is dominant, the phase of the linear combination should nearly equal to that of the primary sub-sample (which is the common phase). Moreover, the actual phase of such interpolated sample (which deviates little from a primary sub-sample) is very close to that of its neighboring primary sub-sample, since the phase increment accrued over one or two sampling time intervals is quite small.

Now consider an interpolated sample half-way between two adjacent primary sub-samples. The interpolated value of this sample is formed as a linear combination with equal weights of the two neighboring primary sub-samples. Thus, its phase is the arithmetic average of the phases of the two primary sub-samples, say, $\hat{\phi}[Mt+M/2]=\{\phi[Mt]+\phi[M(t+1)]\}/2$. Actually, for a Wiener-Levy phase process, this turns out to be the maximum-likelihood estimate of the actual phase $\phi[Mt+M/2]$. While these arguments do not constitute rigorous proof, they do make it plausible that the proposed inter-SB DP and MSDD method may exhibit improved LPN tolerance, as validated by simulations in the next section.

B. Latency within Pairs of Successively Precoded Samples

We note an effect which has been disregarded in our approximate analysis above for phase noise of the primary sub-samples: Not all pairs of adjacent samples in the IN-SF end up as pairs of concurrent interleaved samples, thus affected by the same common phase, hence cancelled out by the MSDD. In the inter-SB scheme all pairs of samples corresponding to intra-frame and inter-frame transitions (subsection II-E) do enjoy the above beneficial property, however there are also pairs of samples straddling the neighboring ends of two adjacent superframes (inter-super-frame frame transition), which are mapped by the ILV into pairs of samples at different times.

Given a DP scheme, precoding successive samples in pairs, and given the Tx processing of the precoded stream of samples, which may permute or more generally rearrange the samples as well as assign them to various spectral sub-bands, what matters in terms of overall phase noise tolerance is the latency between each two samples that were originally precoded in succession by the DP module, but may end up either concurrent or temporally spaced farther apart after the re-arrangement of samples occurring in the Tx. The Inter-SB scheme actually reduces this latency to zero for most of the samples (those participating in intra- and inter-frame transitions, while having finite latency for just the end-sample of an inter-superframe transition.

We conclude that the LPN tolerance is roughly determined by the average latency within pairs of successively precoded samples, once they are rearranged by the TX processing and fed to the DACs. The various latencies may be visualized by locating and inspecting the various pairs of originally successive samples, as depicted in FIG. 7 for the inter-SB scheme. Table 1 averages over the possible relative latencies experienced within all possible pairs of differentially precoded samples, successively emitted by the DP, once they are mapped onto the MUX input by either the interleaver in the Inter-SB case or by the single MN-pnt S/P in the case of Intra-SB. It is apparent that the average relative latency for the Inter-SB scheme is substantially lower than that of the Intra-SB scheme. As latency (relative delay) between pairs of samples translates into phase decorrelation, this indicates that the Inter-SB scheme is likely to be superior to the Intra-SB one.

TABLE 1

Comparison of latencies of the inter-SB and intra-SB schemes.

|  | 0 samples latency | M samples latency | $M(1 + CP)$ samples latency | Average latency |
|---|---|---|---|---|
| Number of samples - Intra-SB | — | $M(N - 1)$ | M | $M \cdot \left(1 + \dfrac{CP}{N}\right)$ |
| Number of Samples - Inter-SB | $(M - 1)N$ | $N - 1$ | 1 | $1 + \dfrac{CP}{N}$ |

CP-Induced Phase Noise in MSDD-Based DFT-S OFDM

An additional mechanism, potentially enhancing (under certain condition stated below) phase noise decorrelation between pairs of samples that were originally successively generated at the DP output, is due to the cyclic prefix (CP) insertion. It turns out that this problem may be manifested in any DFT-S OFDM system employing differential precoding, MSDD based DFT-S OFDM systems in particular. It is possible to avoid this impairment by imposing a particular constraint onto timing recovery, making it more stringent. Popular conventional methods of OFDM (hence also DFT-S OFDM) timing recovery are the so-called delay&correlate (D&C) scheme (e.g. Schmidl-Cox [28] previously used in optical communication, or more recently the Minn algorithm [29] ported to coherent optical OFDM transmission in [30]). D&C OFDM timing recovery is based on transmitting a training sequence consisting of two or more identical (up to a possible sign flip) OFDM symbols and shifting the DFT window until maximum correlation is achieved. The usable DFT window is not unique. Multiple DFT windows may be valid, as long as their starting points fall within a certain sub-segment of the CP, referred to as the valid CP sub-segment, consisting of all points within the CP with distances to the left end of the CP segment exceeding the duration of the impulse response. Notice that the valid CP sub-segment is not affected by ISI from the previous OFDM symbol, hence the rationale for limiting the starting point of the DFT-window within the CP to this sub-segment.

Unfortunately, as we show presently, for DFT-S OFDM+ MSDD systems (or more generally for any DP based DFT-S OFDM system), the usage of differential precoding in the Tx makes it highly undesirable to initialize the Rx DFT window within the valid CP sub-segment, due to severe enhancement in phase noise (although in the absence of phase noise the system would ideally function with its DFT-window starting within the valid sub-segment of the CP). Rather, the correct DFT window must commence right at the first sample following the CP (this desirable window is referred to as the nominal DFT window), else significant phase noise degradation would be generated, were the DFT window to start within the said CP sub-segment. This phase noise degradation effect, whenever the DFT window is started within the CP is referred to here as CP-induced phase noise.

To understand this impairment mechanism, notice that commencing the DFT window within the CP amounts to applying a left cyclic shift to the nominal DFT window. Moreover, CP insertion is a linear operation with respect to the superposition of SBs, in the sense that we could separately work out in the Tx the MN-pnt time record at the main IDFT output due to a particular SB excitation (with all other SBs nulled out), add CP to it, then propagate this single-SB response to the Rx, peel off its CP there and finally propagate the given SB through the Rx. The overall output response would be a superposition of the responses due to all the sub-bands.

Taking the MN-pnt DFT window inside the valid CP sub-segment evidently amounts to applying onto the nominal DFT window a certain right-shift (making the tail of the nominal DFT window wrap around to the beginning of the shifted DFT window, to account for the sub-segment of intersection of the shifted DFT window and the CP). This induces a linear phase shift at either the main DFT output in a conventional DFT-S OFDM Rx or at the 2N-pnt FFT output in a filter-bank based DFT-S OFDM Rx (relative to the response due to the nominal DFT window). This phase shift is compensated for by the 1-tap equalizer stage in each SB, by means of multiplication by the conjugate linear phase factor. Following the final de-spreading N-pnt IDFT, the conjugate linear phase factor amounts to a left cyclic shift, opposite to that effectively applied initially. This indicates that the left-side end segment, representing the intersection of the CP and the originally left-shifted DFT window, is now cyclically left-shifted, wrapped around at the de-spreading IDFT output, appearing MN points to the right (appended to the right side of the tail of the nominal DFT window) relative to its original position, which preceded the nominal DFT window. This now produces a large discontinuity in the laser phase noise. Indeed, upon transmission, the tail of nominal DFT window was distant from the CP head, therefore their relative phase lags were large. Now a portion of the CP head gets appended back to the right of the tail, thus samples that were originally in relative temporal proximity now carry now large phase lags. E.g., at the Tx, the last sample of the CP and the last sample of the block were very far apart, which means that they were strongly phase decorrelated, about MN points, but these points now come to be successive in time, therefore processed in the same MSDD window, but now their large phase decorrelation degrades the MSDD output performance considerably.

Notice that CP-induced degradation may then be completely suppressed by selecting the nominal DFT window (avoiding shifted windows starting within the nominal CP sub-segment). However, the DFT window timing recovery requirement for DFT-S OFDM systems is now more stringent—a unique DFT window must be selected, right at the peak of the delay&correlate autocorrelation waveform, with no slack. Fortunately, these requirements are robustly met by our Minn implementation of the DFT window timing recovery. We conclude that CP-induced phase noise is adequately mitigated by our Minn timing recovery.

Numerical Simulations

We now present numeric simulations of single channel DFT-S OFDM transmission, comparing the performance of the Inter-SB and Intra-SB phase recovery schemes.

The DFT-S OFDM signal is transmitted over a long-haul fiber link, numerically modeled for scalar linear and non-linear effects by the Split-Step-Fourier (SSF) algorithm for a single polarization channel with Tx and Rx (local oscillator) phase noisy lasers and with ASE noise. The simulation parameters are as follows: The dispersion unmanaged fiber link length is 1000 km. The signal launch power is 3 dBm. The transmitted DFT-S signal contains 16 sub-bands, each carrying 64 sub-carriers modulated by 16-QAM, thus (M=16, N=64, MN=1024). The total channel sampling rate is 25 GBaud, thus the channel bandwidth (BW) per sub-band is 25 GBaud/16=1.56 GHz. The 15 active sub-bands occupy a full channel BW of 1.56 GHz*15=23.43 GHz. The $16^{th}$ SB does not carry data but is rather dedicated to the ADC anti-aliasing filter transition, being split into two halves (1.56/2 GHz) at each channel end; there are then 15 data-carrying sub-bands left. The mid sub-band (labeled$^{(0)}$) has its center coinciding with the center of the channel (the DC of the channel complex envelope, corresponding to the optical carrier frequency).

The OFDM cyclic prefix (CP) length is 32 samples for the full channel rate, or 2 samples per sub-band, thus the CP total overhead is CP/(MN)=32/1024=2/64=3.1%. The CP is causally applied (the last CP=32 points of the OFDM symbol at the main IDFT output are replicated ahead of the MN-pnt OFDM symbol). The simulated laser linewidths (LW) for Tx and Rx (local oscillator) are 100 KHz, 200 KHz, 300 KHz and 500 KHz.

The DFT-S OFDM Rx is based on digital sub-banding. A two-fold under-decimated filter bank Rx is used to slice the received channel into sub-bands [2][3] [4]. The DFT-S processing, independently applied per sub-band, comprises the following DSP processing modules: ODFM Timing recovery by the Minn algorithm [29], CP removal, 128-pnt FFT, 1-Tap equalizer, 64-pnt de-spreading IFFT, the output of which feeds into a per-sub-band MSDD in the intra-SB method, whereas in the inter-SB scheme, the outputs of de-spreading FFTs are fed into the de-interleaver, which is followed by a single full-rate MSDD.

Figure 10:
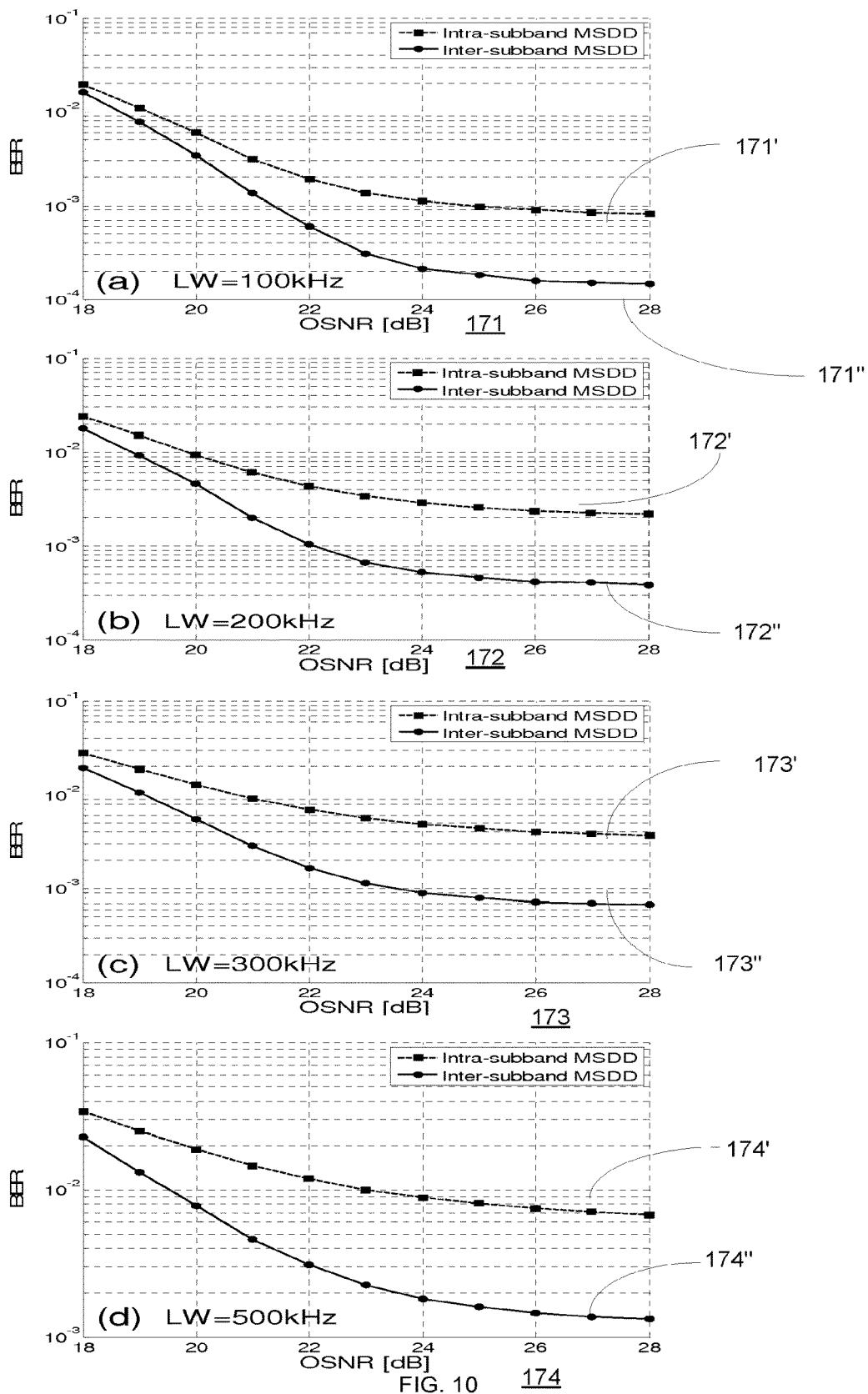
FIG. 10 illustrates the relationships between BER and OSNR according to an embodiment of the invention.

FIG. 10 compares the BER vs. OSNR performance for various laser linewidths. It is apparent that the Inter-SB MSDD scheme is highly effective in mitigating the combination of laser phase noise and nonlinear phase noise, providing improved performance relative to the Intra-SB scheme, the more so the higher the linewidth. As OSNR is increased, laser phase noise becomes the dominant noise source and the BER approaches a horizontal asymptote, at a lower level for the Inter-SB scheme relative to the Intra-SB one.

Impairments of the Inner Vs. End Sub-Carriers in Each SB

Figure 11:
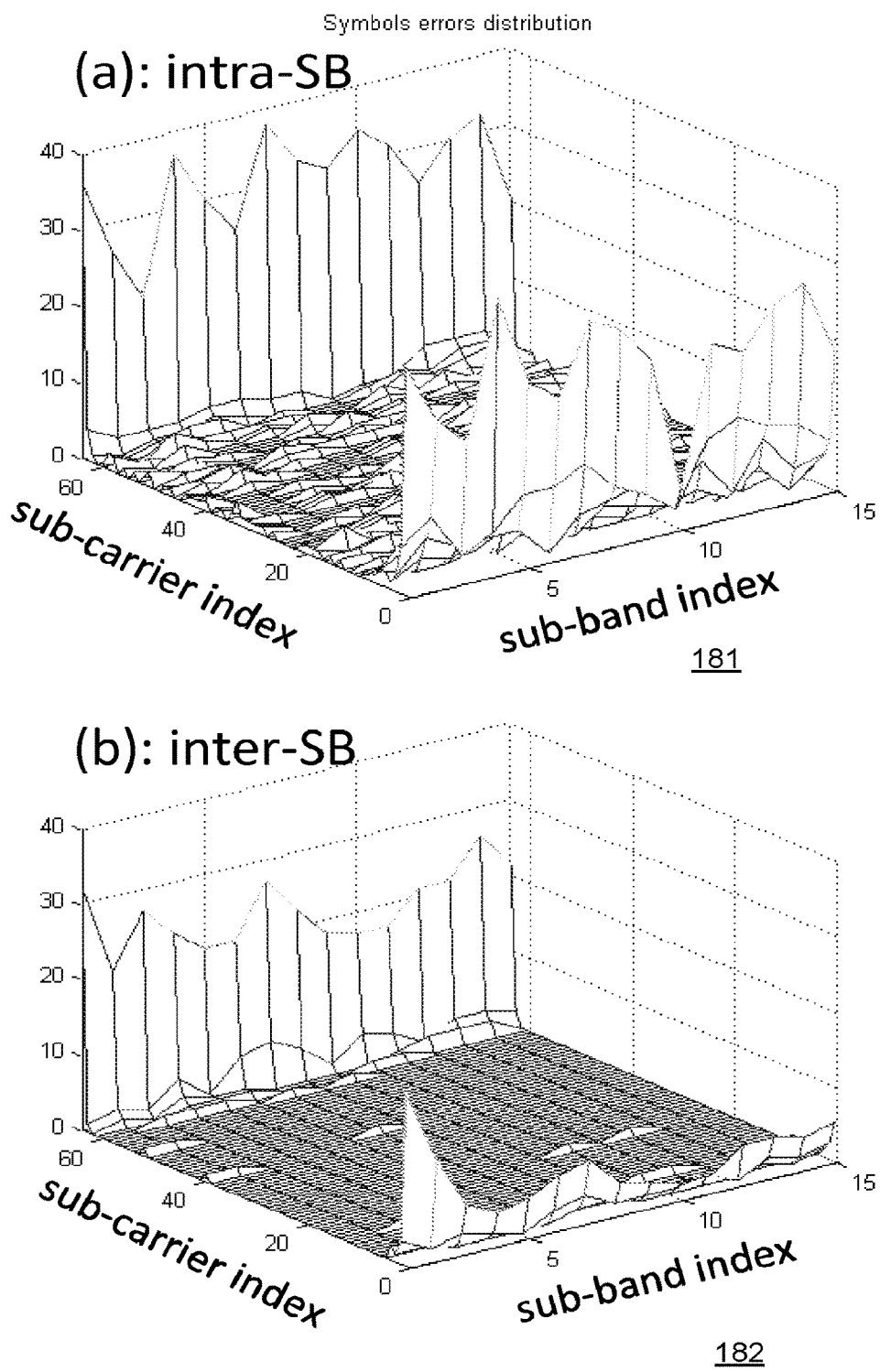
FIG. 11 illustrates error histograms according to an embodiment of the invention.

As seen in the theory of operation (section III), various sub-carriers in various sub-bands may experience different impairments. Here we test this conjecture by simulation, itemizing in FIG. 11 the errors accrued for each SC of each SB in the respective Intra-SB and Inter-SB cases over an interval of $\sim 10^5$ samples ($10^5$ samples per sub-carrier). Inspecting the two sub-FIGS. 181 and 182, it is apparent that the Inter-SB scheme is almost error-free over the time interval for the "inner" SCs (inner SCs meaning all SCs other than the first and last ones in each SB). In contrast, in the Intra-SB case one or a few errors are typically accrued for the inner SCs. Thus, Inter-SB processing benefits the inner SCs. While this effect may be not the most graphically striking in FIG. 11(b), yet it is most significant in terms of aggregate BER performance, as we have many inner SCs, thus their performance dominates the BER.

More graphically prominent, but not dominating the aggregate BER, are the end-effects, for the first or last SCs of the various SBs. In the Intra-SB case, many errors are seen to be accrued for the first and last SCs in each SB (the rugged "walls" at SC index 0 and 63 for any SB index in FIG. 11(a)). The Intra-SB end-effect at the SC indexed 0 in each SB is consistent with FIG. 8, wherein it is apparent that the phase reference for the $0^{th}$ SC in each SB is taken from the (N−1)-th SC of the same SB in the previous frame, thus the relative lag for phase decorrelation is long (M+CP samples), degrading BER performance for the $0^{th}$ SC sample which gets demodulated in the MSDD with the time-remoted reference.

As for the Intra-SB degradation of the last SC of each SB (SC index N−1=63, the "back walls" in graphs 181 and 182 in both the Intra- and Inter-SB cases, we conjecture that this is due to the fact that a causal CP is unable to protect the end sample at the symbol tail from non-causal inter-SB-interference (ISBI) caused by the non-causal impulse response of the filter-bank, which has a duration of 3 samples (thus it affects one neighbor on either side). In the Inter-SB case, it is just the first SCs in the first SB that is significantly degraded, whereas in the Intra-SB case all first SCs of all SBs are significantly degraded. In the Intra-SC case, all the first SCs of all the SB (the "front wall" in graph 181) have their respective references taken from the last SC in the last superframe, experiencing lags of M+CP samples, accounting for their large degradations. In contrast in the Inter-SB case (graph 182), it is just the first SC of the first SB that has its reference taken from the last sample of the previous super-frame (a super-frame transition has a lag of M+CP samples, separating the first sample of the last frame in the current superframe from the first sample of the first frame in the next superframe). In the inter-SB case, it is just one first SC (in the first SB) that is degraded rather than having M−1 first SCs in M−1 respective SBs degraded as in the intra-SB case. In light of this, in the inter-SB case, one would expect that the first SCs of the other SBs, beyond the first one, not be degraded at all. However, via error propagation mechanism, errors in the first SC of the first SB, which acts as reference for the second SC of the first SB, will also degrade, the second SC of the first SB, though with diminished probability and so forth. The error propagation of the sequence of first SCs is supposed to diminish rapidly as we advance from one SB to the next. We do not have a satisfactory explanation why there are still residual errors in the first SC of SBs with higher index, though we conjecture this may be related to imperfect filter-bank filtering.

It is these degradation mechanisms as detailed above that are responsible for the "BER floor" asymptotic limiting performance in FIG. 10 as the OSNR is increased. Graphs 171, 172, 173 and 174 includes curves 171', 172', 173' and 174' for illustrating the BER to OSNR for intra-sub-band MSDD and curves 171", 172", 173" and 174" for illustrating the BER to OSNR for inter-sub-band MSDD according to an embodiment of the invention.

Overall, accumulating all errors from all SCs in all SBs in the two cases, consistently yields fewer errors in the Inter-SB case, as reflected in the improved Inter-SB performance in FIG. 10.

As the end SCs are more prone to BER degradation, it is further possible to either exclude them from data transmission and discard them in data reception in order to improve BER performance at the expense of some loss in SE, or to encode them with lower-order constellations (e.g, QPSK rather than 16-QAM) partially recovering the loss in spectral efficiency.

These is provided a zero-overhead interleaving method (no increase in complexity and no loss of spectral efficiency) for DFT-S OFDM systems based on differential precoding and MSDD, significantly enhancing the phase noise tolerance of such systems. The principle of interleaving is to parallelize neighboring serial time samples and place them at the same input index in neighboring FFT sub-blocks in a DSP-spread Transmitter. In this case, the neighboring samples and their interpolations will be overlapped in time at the transmitter, thus approximately experiencing similar laser phase noise and reduced phase noise penalty.

Although this paper has specifically simulated the usage of the MSDD carrier recovery method [13, 14] with DFT-spread OFDM, it is expected that the non-redundant inter-leaving inter-SB advantage be retained even when other carrier recovery methods are used, e.g., [21], [14]-]18], however detailed comparisons of performance are relegated to future work, along with several other aspects requiring further study: the impact of the DFT-S system number of sub-bands, M, the spreading FFT size N and the CP duration on the relative performance of the inter- and intra-SB schemes; a comparison of the proposed inter-SB phase recovery method with pilot-tone based methods, as well as investigate potential combination of the two sub-band based carrier recovery methods, which may be most beneficial.

According to an embodiment of the invention there is provided an orthogonal frequency division multiplexing (OFDM) transmitter, that includes an encoder (such as differential precoder 52 of FIG. 5), an interleaver (such as interleaver 80 of FIGS. 5 and 7), a symbol processor (such as FFTs 53(1)-53(3) of FIG. 7 or FFT 53 of FIG. 5) and a transmission module (such as transmission module 56 of FIG. 5).

The encoder is configured to encode a superframe to provide an encoded superframe (such as encoded superframe 110 of FIG. 7). The encoded superframe comprises a sequence of encoded frames (such as encoded frames 110(1), 110(2), 110(3) and 110(4) of FIG. 7).

The interleaver (such as interleaver 80 of FIG. 7) is configured to allocate multiple frequency sub-bands to each encoded frame of the encoded superframe by assigning adjacent frequency sub-bands to successive symbols of each encoded frame (for example the three symbols of first encoded frame 110(1) of FIG. 7 are sent to the three 1:N serial to parallel converters that are associated with three sub-bands).

The symbol processor is configured to generate, for each encoded frame and according to the assignment of the multiple frequency sub-bands, an intermediate set of symbols (For example, in FIG. 7, see intermediate set 130(1) that is represented by a highlighted circle followed by *, intermediate set 120(2) that is represented by a highlighted triangle followed by *, intermediate set 120(3) that is represented by a highlighted rectangle followed by *, and intermediate set 120(4) that is represented by a highlighted X followed by *).

The transmission module (such as 56 of FIG. 7) is configured to transmit simultaneously, for each encoded frame, OFDM symbols that represent the intermediate set of symbols.

Figure 12:
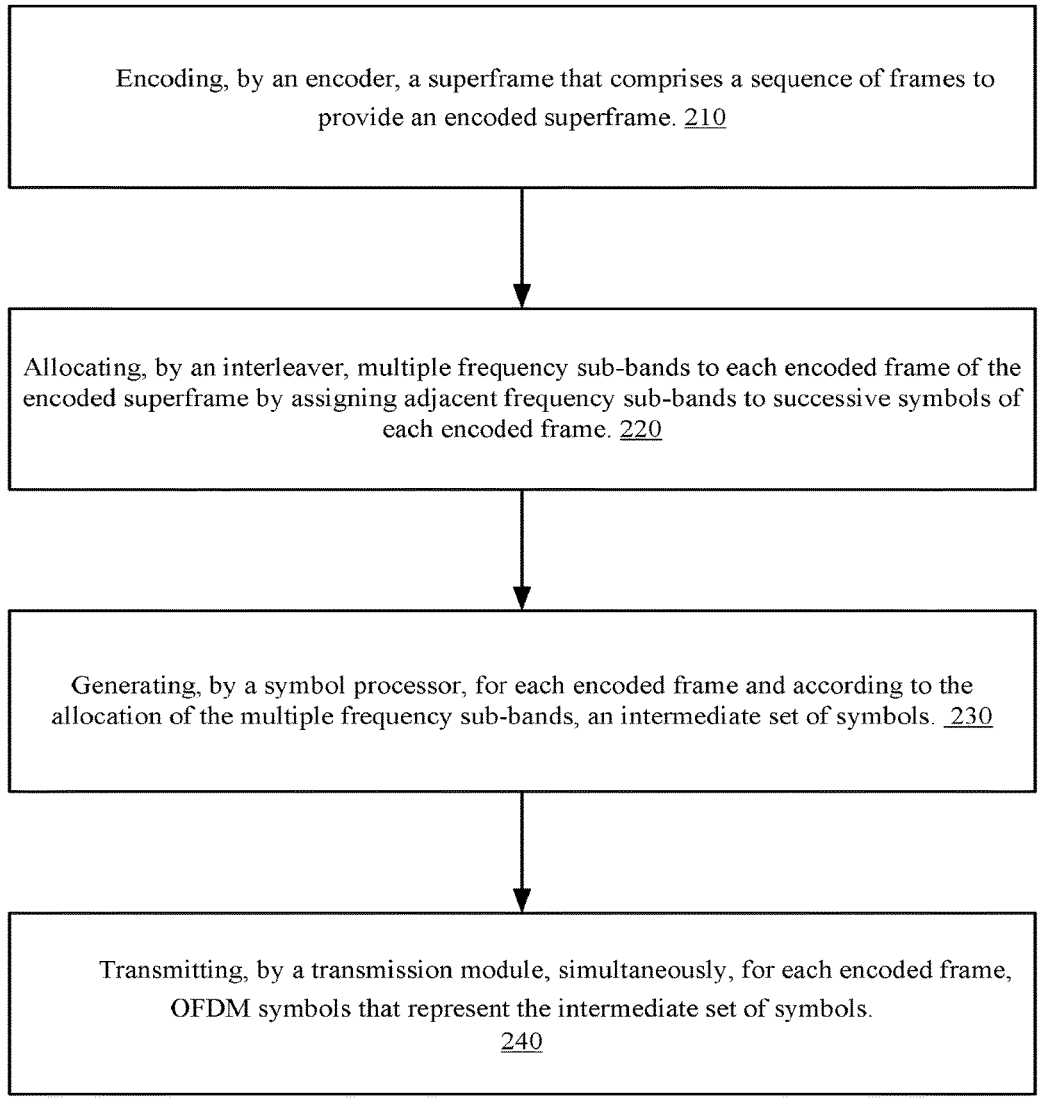
FIG. 12 illustrates a method according to an embodiment of the invention.

FIG. 12 illustrates method 200 according to an embodiment of the invention.

Method 200 starts by step 210 of encoding, by an encoder, a superframe that comprises a sequence of frames to provide an encoded superframe.

Step 210 may be followed by step 220 of allocating, by an interleaver, multiple frequency sub-bands to each encoded frame of the encoded superframe by assigning adjacent frequency sub-bands to successive symbols of each encoded frame.

Step 220 may be followed by step 230 of generating, by a symbol processor, for each encoded frame and according to the allocation of the multiple frequency sub-bands, an intermediate set of symbols.

Step 230 may be followed by step 240 of transmitting, by a transmission module, simultaneously, for each encoded frame, OFDM symbols that represent the intermediate set of symbols.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. An orthogonal frequency division multiplexing (OFDM) receiver, comprising: a decoder, a de-interleaver, a symbol processor, and a reception module; wherein the reception module is constructed and arranged to receive OFDM symbols representative of an encoded superframe that comprises multiple encoded frames; wherein the symbol processor is constructed and arranged to generate, in response to OFDM symbols associated with each encoded frame, all received symbols that are associated with the encoded frame; wherein adjacent symbols of each encoded frame are represented by OFDM symbols that belong to adjacent sub-bands; wherein the de-interleaver is constructed and arranged to de-interleave all received symbols that are associated with each encoded frame to provide the encoded superframe; and wherein the decoder is constructed and arranged to decode the encoded superframe to provide a decoded superframe.

2. The OFDM receiver according to claim 1 wherein the reception module comprises an optical to electrical converter, an analog to digital converter, synchronizer and cyclic prefix drop and serial to parallel converter, a Fast Fourier Transform converter, a single tap equalizer, multiple Inverse Fast Fourier Transform unit converters, multiple Multi-symbol Differential Detection modules and a parallel to serial converter.

3. A method for receiving orthogonal frequency division multiplexing (OFDM) signals, comprising receiving OFDM symbols representative of an encoded superframe that may include multiple encoded frames; generating, in response to OFDM symbols associated with each encoded frame, all received symbols that are associated with the encoded frame; wherein adjacent symbols of each encoded frame are represented by OFDM symbols that belong to adjacent sub-bands; de-interleaving all received symbols that are associated with each encoded frame to provide the encoded superframe; and decoding the encoded superframe to provide a decoded superframe.

* * * * *